(12) United States Patent
Wilkinson et al.

(10) Patent No.: US 7,409,333 B2
(45) Date of Patent: Aug. 5, 2008

(54) TRANSLATION OF ELECTRONICALLY TRANSMITTED MESSAGES

(75) Inventors: Alan Wilkinson, Hove (GB); Edward Charles Marshall, Worcester (GB)

(73) Assignee: Translution Holdings PLC, Malvern, Worcestershire (GB)

( * ) Notice: Subject to any disclaimer, the term of this patent is extended or adjusted under 35 U.S.C. 154(b) by 54 days.

(21) Appl. No.: 11/122,996

(22) Filed: May 5, 2005

(65) Prior Publication Data

US 2005/0267738 A1 Dec. 1, 2005

Related U.S. Application Data

(63) Continuation of application No. PCT/GB03/04726, filed on Nov. 4, 2003.

(30) Foreign Application Priority Data

Nov. 6, 2002 (GB) .................................. 0225817.6

(51) Int. Cl.
*G06F 17/28* (2006.01)
(52) U.S. Cl. .............................................. 704/2; 704/5
(58) Field of Classification Search ...................... 704/2, 704/5
See application file for complete search history.

(56) References Cited

U.S. PATENT DOCUMENTS

| | | | |
|---|---|---|---|
| 5,175,684 A | * | 12/1992 | Chong |
| 5,497,319 A | | 3/1996 | Chong et al. |
| 5,541,837 A | * | 7/1996 | Fushimoto ...................... 704/2 |
| 5,568,383 A | * | 10/1996 | Johnson et al. ................. 704/2 |
| 5,621,727 A | * | 4/1997 | Vaudreuil |
| 5,884,246 A | * | 3/1999 | Boucher et al. |

(Continued)

FOREIGN PATENT DOCUMENTS

| | | |
|---|---|---|
| EP | 0 449 230 | 10/1991 |
| EP | 0 914 637 | 5/1999 |
| EP | 1 081 619 | 3/2001 |
| GB | 2 368 693 | 5/2002 |
| WO | WO 98/01807 | 1/1998 |
| WO | WO 01/57722 | 8/2001 |
| WO | WO 02/082775 | 10/2002 |
| WO | WO 02/102022 | 12/2002 |

OTHER PUBLICATIONS

Kopete, see especially http://kopete.kde.org and http://kopete.kde.org/index.php?page=roadmap.

(Continued)

*Primary Examiner*—Patrick N. Edouard
*Assistant Examiner*—Eric Yen
(74) *Attorney, Agent, or Firm*—Weingarten, Schurgin, Gagnebin & Lebovici, LLP

(57) ABSTRACT

A communication system for human communication comprises a sending computer system 11, a receiving computer system 21a and a translation web site 31. The sending system 11 is arranged, when sending a communication, to determine a first human perceptible language associated with the sender and a second human perceptible language associated with the recipient and, if the first and second languages are different, to send the communication to the translation system 31 for translation. The address of the receiving system is sent with the communication. The diverted communication is translated, and forwarded by the translation system 31 to the receiving system.

If the first and second languages are the same, the communication is sent by the sending system 11 directly to the receiving system 21a. The receiving system checks the language of incoming communications against that of the recipient and, if necessary, sends the communication to the translation site 31 for translation and return.

13 Claims, 8 Drawing Sheets

U.S. PATENT DOCUMENTS

| | | | |
|---|---|---|---|
| 5,930,479 | A * | 7/1999 | Hall |
| 5,960,382 | A | 9/1999 | Steiner |
| 6,119,078 | A * | 9/2000 | Kobayakawa et al. |
| 6,161,082 | A * | 12/2000 | Goldberg et al. ............... 704/3 |
| 6,247,045 | B1 * | 6/2001 | Shaw et al. |
| 6,339,795 | B1 * | 1/2002 | Narurkar et al. |
| 6,347,316 | B1 * | 2/2002 | Redpath |
| 6,385,568 | B1 * | 5/2002 | Brandon et al. |
| 6,463,404 | B1 * | 10/2002 | Appleby |
| 6,632,251 | B1 | 10/2003 | Rutten et al. |
| 6,857,022 | B1 * | 2/2005 | Scanlan |
| 2002/0004822 | A1 | 1/2002 | Azuma |
| 2002/0022954 | A1 | 2/2002 | Shimohata et al. |
| 2002/0123879 | A1 * | 9/2002 | Spector |
| 2002/0169592 | A1 * | 11/2002 | Aityan |
| 2003/0125927 | A1 | 7/2003 | Seme |

OTHER PUBLICATIONS

Systran, see especially http://www.translation.net/systran.html and http://www.translation.net/syspro.html.

Fire, see especially http://fire.sourceforge.net and http://fire.sourceforge.net/history/readme029.html//a.

"International Preliminary Examination Report" dated Sep. 8, 2005, which issued in priority application No. PCT/GB2003/004726 filed Nov. 4, 2003.

* cited by examiner

TRANSLATION OF ELECTRONICALLY TRANSMITTED MESSAGES

This is a continuation of International Application No. PCT/GB2003/004726 with an international filing date of Nov. 4, 2003, and claims priority from British patent application No. 0225817.6 filed Nov. 6, 2002.

The present invention relates to the automatic translation of electronically transmitted messages. It is applicable to all forms of electronically transmitted messages, but has particular application in internet based email systems, instant messaging systems, email based fax systems and other forms of electronically transmitting text such as SMS messages.

As the amount of international communication by electronic means increases, the problem of users of the communication system having different natural languages becomes increasingly more significant. The need for an effective automatic language translation service is therefore becoming increasingly important.

Solutions to the problems of providing automatic translation of electronic messages have been proposed, for example by Boucher et al in U.S. Pat. No. 5,884,246 and Scanlan in WO 01/02994. In the Boucher approach the address of a translation site is concatenated onto the destination address of the message so that the message is delivered to the translation site. At the translation site the message is translated and then delivered to the recipient. The Boucher approach suffers from several problems:

1) A mechanism is described for redirection of messages to a central site for translation and not a comprehensive user-oriented solution for providing automatic translation of messages that integrates into a users existing messaging system.
2) There is no indication of how contacts within an address book of a messaging system may be used to ensure that the system automatically redirects messages for translation. Unless the recipient's language is predefined in some manner, the system cannot make a decision as to whether a message requires translation.
3) Boucher describes two methods of defining the recipient's preferred language. Either the sender specifies it within the email address or the top level domain name of the recipient could be used to infer the recipient's language. The first approach implies user intervention thereby causing a deviation from the normal working practices for sending messages, whereas the second approach may not be appropriate for the person receiving the message especially in a country with more than one official language.
4) There is no indication of how the address concatenation mechanism may be used with multiple recipients of electronic messages.
5) There is no indication of how replies or forwarding of messages ought to be handled.
6) There is no indication of how to handle messages received by a recipient that is not in their preferred language.

In the Scanlan approach the recipient is required to register a new message address upon the translation site. A person sending a message to the recipient sends it to this new address whereupon the recipient retrieves the translated message using their existing message client application program resident upon their computer system. The Scanlan approach also suffers from several problems:

1) The recipient is required to register a new message address for the purposes of receiving translated messages.
2) The recipient would have to register a new message address for each language they wish to receive and therefore would have multiple addresses.
3) The sender has to be aware of this new message address.
4) The sender cannot be charged for the translation services rendered.
5) The new message address is spelt in one language yet will be accessed by users across many language domains.
6) The sender has no control over which parts of the message is translated.
7) The sender has no control over the translation process which might affect the quality of the translated message.

Neither Boucher nor Scanlan address the complexities of handling translated messages when a user replies to a message or forwards a message. Unless steps are taken to package information within a message in a structured manner then multiple translations of the same text might occur when replying to a message or cascaded translations of the original text when forwarding a message. Moreover, when a message is forwarded it will contain as many translations as the number of times the message has been forwarded which when coupled with replies may prove an inconvenience to view only those parts of the message in a users preferred language.

Human translation is not an exact science and machine translation is still striving to match the same level of quality as that produced by human translators. Any central site that provides a machine translation service needs to support an ability to accommodate translation options that are used to configure the translation process and thereby heighten the quality of the translated output. Although Boucher marginally touches upon this issue, Scanlan does not make reference to the issue of translation options whatsoever.

The Boucher patent is primarily concerned with a mechanism for redirection of messages through manipulation of the destination address. The redirection methodology relies upon the fundamental architecture of Uniform Resource Locators (URLs) addresses to effect redirection and thus Boucher is limited to redirection of messages using this addressing scheme. Boucher provides some indications of how the mechanism could be applied in a system with several references to automating the mechanism through the use of an add-in module that can be constructed by those skilled in the art of computer programming. However, the features and facilities required of the add-in to construct a fully functional system are not covered nor is there any comment as to how the existing features of a messaging system such as a contact list may be used to automate the translation process. The Scanlon patent essentially describes a website where translation of messages takes place.

A system that purports to provide automatic translation of electronic messages needs to satisfy the following objectives:
1) System does not require user intervention to effect translation of electronic messages.
2) Seamless integration into a user's existing messaging system.
3) User is not forced to change their normal working practices.
4) User is not forced to acquire additional resources such as extra or specialist email addresses.

Stemming from these objectives, the salient features and facilities of an automatic electronic message translation system are:
1) A system that enables users to communicate across language barriers whilst at the same time allowing them to use their existing communication addresses.

2) A mechanism for redirecting messages to a central site providing machine translation services.
3) A message redirection mechanism that does not require user intervention.
4) A message redirection mechanism that can be applied equally to email messages as well as other forms of electronic communication.
5) An ability to redirect messages both at the sending and receiving end of the communication link to the central site for translation.
6) An ability to automatically detect the language of an incoming message in order to compare it with the users own language.
7) Provision of an add-in module that automates the redirection process and communicates with the central site providing the message translation services.
8) Access to sender and recipient languages so that a comparison can be made to determine whether translation is warranted.
9) A message redirection mechanism that does not hinder the ability to send a message to multiple recipients.
10) A system that supports an ability to send a message to multiple recipients each of whom may have a different language.
11) An ability to handle translation of email body separately from any attachments.
12) An ability to handle emails within emails and their respective attachments.
13) A provision for structured packaging of translated messages to support the complexities of handling replying and forwarding of messages along with a filter to view only those sections of a message in the viewers own language.
14) An ability to define a range of translation options for the message to heighten translation quality.
15) An ability to mark sections of text that ought not to be translated, such as addresses.
16) An ability to re-submit a received message to the translation site and apply translation options to improve translation quality.
17) An ability for the sender to cause echo-back of a message to monitor translation issues such as 'not found words'.
18) An ability for the recipient to submit an un-translated message to the central site for translation.
19) An ability for the recipient to resubmit a message to the central site to change the translated language if it is not the recipient's preferred language as well as subsequently to improve the quality of translation.
20) An ability to handle secure communication covering encrypted messages as well as messages sent over an un-secure network.
21) The overall system operates as an integrated whole to provide the benefits of automatic message translation without the necessity to learn new skills or acquire additional resources.

Unless the above items are addressed within any proposal then the resultant system cannot be considered as being a comprehensive and fully automatic system for translation of electronic messages.

Accordingly, the present invention provides a communication system for human communication comprising a sending system arranged to send a communication from a sender, a receiving system arranged to receive the communication for a recipient, and a translation system, wherein the sending system is arranged, when sending a communication, to determine a first human perceptible language associated with the sender and a second human perceptible language associated with the recipient and, if the first and second languages are different, to send the communication to the translation system for translation, together with the address of the receiving system thereby to enable the translation system to receive the diverted communication for translation, and to forward the translated communication to the receiving system, but if the first and second languages are the same, to send the communication directly to the receiving system, and wherein the receiving system is arranged, on receiving a communication, to determine a first human perceptible language associated with the sender and a second human perceptible language associated with the recipient and, if the first and second languages are different, to send the communication to the translation system for translation, together with the address of the receiving system thereby to enable the translation system to receive the communication for translation, and to return the translated communication to the receiving system, but if the two languages are the same, to accept the communication sent to the receiving system.

The present invention further provides a communication system comprising a sending system arranged to send a communication from a sender to a recipient, and a translation system wherein the sending system is arranged to determine when a communication needs to be translated and to forward it to the translation system for translation, and the sending system includes a sender input arranged to enable the sender to send a communication to the translation system for translation and return to the sender for checking before the translated communication is sent to the recipient.

The present invention still further provides a communication system comprising a receiving system arranged to receive a communication for a recipient, and a translation system, the receiving system comprising display means arranged to display the communication for review by the recipient, and a recipient input arranged to enable the recipient to submit the received communication to the translation system together with at least one translation parameter thereby to provide a recipient controlled translation of the received communication.

The translation parameter may comprise the language in which the communication is received, or may comprise a specialist or customized translation dictionary or glossary, or an indication of a style or category of the content of the communication.

Advantages of some of the features of the preferred embodiments of the invention will now be described.

Some embodiments of the present invention described herein provide a system and method that overcomes the shortcomings of the Boucher and Scanlan approaches as well as addressing the issues of handling messages during reply and forwarding. The system preferably consists of an add-in module resident upon a user's computer system together with a central site providing translation services. The add-in module operates in unison with an existing message client application program resident upon the user's computer system. The collaborative association between the add-in module and the central site providing translation services means that the process of translating an electronic message passed between sender and recipient is totally invisible to both parties.

Placing the translation services on a central site means that all of the complexities of supporting translation across many languages are not loaded upon the user's system. Furthermore, having a central translation resource means that in principle it is accessible by all, the latest machine translation technology is available to everyone and a wide range of language pairs can be made available.

The add-in module determines whether a message requires translation based upon sender and recipient languages. A difference in the two languages causes the add-in to redirect the message to the central site for translation whereupon the translated message is then conveyed to the recipient. Message redirection can be undertaken either upon the sender's computer system, the recipients' computer system or upon an intermediate server handling messages sent between both sender and recipient. When redirection is undertaken upon the sender's computer system the add-in module can make use of previously defined information about the sender's language and the recipient's preferred language. In contrast when redirection is undertaken upon the recipient's computer system or an intermediate server then the sender's language can only be determined from the message text itself using automatic language detection techniques whereas the recipient's language is assumed to have been previously defined, for example by being input or selected by the recipient.

Message redirection is performed upon the sender's computer system for newly created messages and upon the recipient's system or intermediate server when a message is delivered that is not in the recipient's preferred language. Redirecting either at sender or recipient ends of the communication link is appropriate when both participants in the communication are connected to an Internet Service Provider (ISP), whereas redirecting upon an intermediate server is particularly appropriate where an organisation possess its own messaging capability through local servers.

The central site providing the translation service receives messages from the add-in module whereupon information placed into the message header and the main body of the message by the add-in is used to configure the translation process. Once the translation has been completed, information in the message header is used to convey the translated message to the intended recipient. The additional information placed into the message header or attached to the message in dedicated sections is deleted from the message before being delivered to the recipient.

The collaboration between the add-in module and the central site ensures that the process of translation is totally invisible to both sender and recipient. Also, both parties use their existing email address for the purposes of communication with each other.

The principle aim of the invention is to provide transparent translation of electronically transmitted messages. A further aim of the invention is to provide a system that does not require the participants in the communication to alter their normal working practices or acquire additional resources to facilitate translation of electronically transmitted messages.

The invention relates to the translation of textual communication such as email messages but is not limited to this form or communication. The electronic message could include audio and audio/visual communication as well as any other form of electronic communication that might require translation in conveying a message from sender to receiver.

The communication may be transported over a computer network covering local area network, Intranet and the Internet but not limited to these forms of transporting a message.

The invention provides a system and methods for translating communication that is transported through a computer network with communication being dispatched in a first humanly perceptible language and arriving at its destination in a second humanly perceptible language. The communication begins at an originating site and is transported across a computer network to a destination site. The locations of both originating and destination sites being designated by an address that is commonly used in the message transport protocols used on computer networks.

The invention resides in a system and methods that provide transparent translation of electronically transmitted messages. The system consists of a module installed upon a user's computer system that integrates into existing application packages used to create, send and receive electronic messages. Modules that integrate into an existing application to provide additional features and facilities are known as add-in or plug-in modules in the computer industry. The add-in module operates in association with a central site that provides value-added services which includes but is not limited to transparent translation of electronic messages.

The central site may consist of an arrangement of computer systems that are linked to provide a single coherent computational resource. The purpose of the central site is to receive a message sent by an add-in module, translate the message from a first humanly perceptible language into a second humanly perceptible language and convey the translated message to a destination site. The collaborative arrangement between add-in module and central site provides the transparency in translating electronically transmitted messages, and does not require the participants in the communication to alter their normal working practices or acquire additional resources.

Although an add-in module can facilitate the seamless integration of the technology described herein into a user's existing messaging system, nevertheless in another embodiment of this invention it is recognised that the technology contained within the add-in could be integrated into an existing messaging system by the manufacturer of that system. Although this approach would provide identical features and facilities as the add-in, nevertheless this would limit the technology to a particular messaging system. Thus the embodiment described herein is through the use of an add-in module.

The add-in module can reside upon either the sender's computer system, the recipient's computer system or upon some intermediate server that handles messages sent between both sender and recipient. The add-in module intercepts a message and matches the sender's language with the recipient's language. If a match between the two languages is encountered the add-in ignores the message allowing the message to be handled in the normal way otherwise a mismatch causes the add-in to redirect the message to the central site for translation. After the central site has translated the message it is conveyed to its destination site.

An add-in module resident on the sender's system intercepts an outgoing message and matches the sender's language with the recipient's language whereupon a mismatch in these languages causes the add-in module to redirect the message to the central site for translation. The sender's language is assumed to have been previously defined, for example by being input or selected using the sending system, by the sender or other user of the sending system, and the recipient's language is obtained either from an electronic address book associated with the electronic messaging application or requested from the sender themselves.

Use of the add-in module with the system, facilitates selection of language names in human readable form. Moreover, selection of a language name is not constrained by a particular language domain since the add-in module can map all the domain specific variants of a language name to a common representation. The add-in module conveys this common representation of a language name within the message sent to the central site whereupon after the central site has used the language information it is discarded from the message.

An add-in module resident upon the recipient's system intercepts an incoming message and matches the sender's language with the recipient's language whereupon a mismatch in these languages causes the add-in module to redirect the message to the central site for translation. The sender's language is obtained by using well established automatic language detection techniques upon the message text and the recipient's language is assumed to have been previously defined, for example by being input or selected using the receiving system, by the recipient or another user of the receiving system.

An add-in module resident upon an intermediate server intercepts an incoming message and matches the sender's language with the recipient's language whereupon a mismatch in these languages causes the add-in module to redirect the message to the central site for translation. The sender's language is obtained by using well established automatic language detection techniques upon the message text and the recipient's language is obtained from an electronic address book associated with a message transport server application running upon the intermediate server.

The add-in module resident upon either sender or recipient systems is intended for use by people who use Internet Service Providers (ISPs) to connect to the Internet to send and receive electronic messages. The add-in module resident upon an intermediate server is intended for use by organisations that provide message transport services using their own local servers.

The add-in module redirects an electronic message by saving the original destination site address within 'user-defined' fields in the message header and replacing it with the address of the central site. Once the message has been translated by the central site the original destination address is restored and modifications to the message header discarded. The central site then forwards the resultant message to the intended recipient.

The add-in module after determining both sender and recipient languages adds these to 'user-defined' fields in the message header for use by the central site. Once the central site has used this information to translate the message the modifications made to the message header are discarded. The central site then forwards the resultant message to the intended recipient.

The add-in module can determine not only the principle recipient of the message but also any other recipients of the message. Under this circumstance there could be as many destination languages as there are recipients of the message. The add-in module packages the message for redirection to the central site for each destination language involved across all recipients thereby avoiding any multiple translations at the central site.

The fundamental aspects of the invention are the use of an add-in module to provide extra features and facilities to an existing electronic messaging application coupled with a central site to provide translation services offers transparency in the translation service provided but moreover does not force users to change their normal working practices or acquire additional resources such as extra message addresses.

It is recognised that human translation is not an exact science and machine translation is still striving to achieve the same levels of quality as human translators, therefore multiple translations of the same text needs to be avoided. The central site packages both the original text and the translated version into a single logical unit within the message each time a message is processed by the central site. When a user replies to a message their contribution is attached to the front of the current message before the complete message is returned to the original sender. Since the central site packages both original text and translated version this eliminates the requirement to perform multiple translations. This method is repeated each time a reply is sent adding a further logical unit to the message consisting of original text plus translated version. Since both language versions of the original message and reply are available to both participants in the communication, each can view the replies in their own language as well as the complete message showing all languages.

A variation upon the above method used to handle replies is required when a user forwards a message. In this circumstance the central site packages the original text plus a translated version of the text for each occasion the message is forwarded. Since the original text is available each time the messages is forwarded another language variant is attached to the logical unit derived from the original text thereby avoiding cascaded translations of the original text. Since the original message and all language versions are available to all participants in the communication, each can view the message in their own language.

The method of packaging original text plus all translated versions into a single logical unit within the message by the central site functions equally for replying to a message as well as forwarding a message and to any combination that might occur.

The standards currently used by the computer industry to exchanging electronic text based messages provides an ability to attach other types of communication to the message including but not limited to plain text, formatted text, audio, audio/visual and images. It is recognised that not all of these message types require or are suitable for translation. Therefore, the method assumes that an attachment will not be translated unless otherwise instructed by the user creating the message.

When an electronic message contains attachments that a user has elected to translate then the issues associated with replying to and forwarding a message apply equally to attachments. The central site will package into a single logical unit both the original attachment and translated version in exactly the same manner as for the message text.

Machine translation currently requires human input in the terms of various options to heighten translation quality towards that which can be achieved from a human translator. The add-in module makes possible the input of these translation options outside of the existing messaging application and for these options to be packaged in a dedicated section within the electronic message for use by the central site to configure the machine translation process. After the central site has made use of the translation options they are discarded from the message before the central site forwards the translated message to the destination site.

In accordance with another aspect of the invention it is recognised that once a sender has dispatched a message any problems encountered during the translation process are not visible to the sender since the translated message is forwarded onto the destination site. Through the add-in module the sender can submit a message to the central site and have the translated message returned to themselves along with a report of any problems encountered by the machine translation process plus any recommendations that might be appropriate to resolve the problems. The procedure can be repeated until the sender is satisfied with the results of the machine translation.

In accordance with another aspect of the invention it is recognised that when a message is intercepted at the recipient end of the communication link, automatic language detection is used to determine whether translation is required. The most successful approach currently available for determining a language from the text itself uses a statistical based approach where the accuracy of the result becomes greater the longer the length of text that is available. Any uncertainty about the source language and the message has to be placed into the recipient's message box allowing the user to take whatever appropriate action they consider necessary. Furthermore, the add-in module intercepting the message has no prior knowledge of message content and thus cannot set up any translations options for the message therefore the quality of machine translation that can be achieved is best described as a gist of the original text that is sufficient for the recipient to obtain an appreciation of the original message. Yet another facet of the system that is important to consider at this juncture concerns the fact that the sender defines the recipient's preferred language with the attendant risk that an inappropriate language may be chosen. Putting all these issues together means that the add-in module is required to provide a facility whereby a recipient can elect to resubmit a chosen message to the central site for translation. Through the add-in module the user can specify their preferred language for the message, plus define a set of translation options they consider appropriate. The procedure can be repeated until the recipient is satisfied with the results of the machine translation.

It is recognised that an electronic message may be embedded within another electronic message. In accordance with another aspect of the invention the embedded message is processed using the same methods as those used to process the encapsulating electronic message.

Preferred embodiments of the present invention will now be described by way of example only with reference to the accompanying drawings in which:

FIG. 7 is a flow diagram showing a first mode of operation of the receiving system of FIG. 2a;

Figure 1:
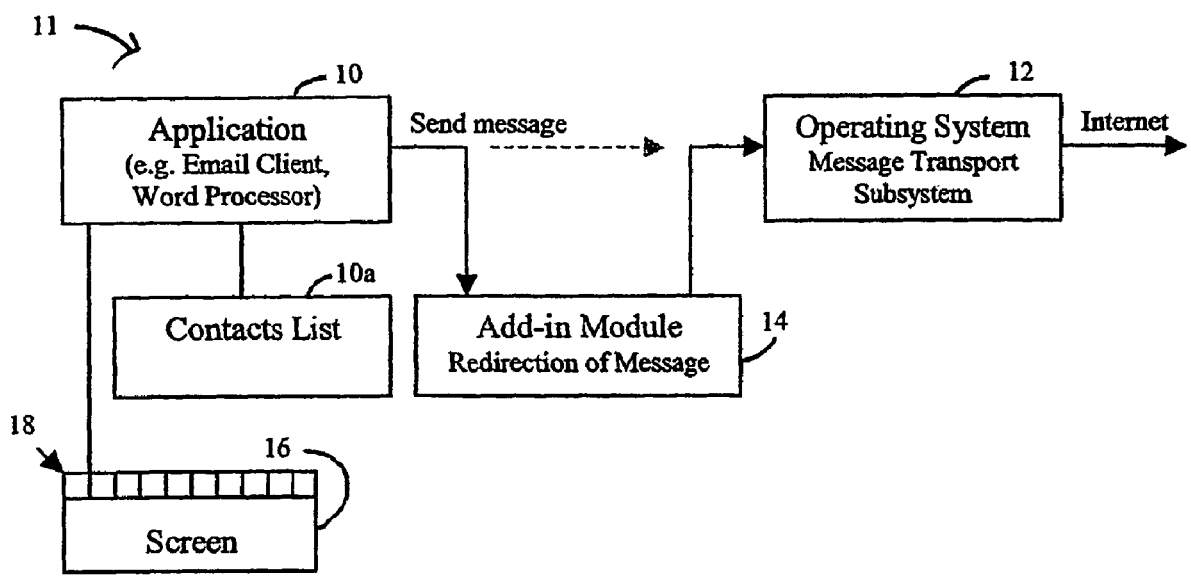
FIG. 1 is a diagram of a sending system forming part of a communication system according to a first embodiment of the invention.

Referring to FIG. 1, a sending system 11 forming part of a communication system takes the form of a personal computer and includes an application 10 comprising an email client, an operating system 12 which includes a message transport subsystem and is connected to the Internet, and an add-in module 14. A screen 16 displays an application toolbar 18 allowing the sender to operate various functions of the system as will be described below. The email client also includes a contacts list 10a containing the preferred language of the recipient.

When the user sends a message, the application 10 generates a 'send message' event in response to user hitting the 'send message' button 101 (see FIG. 4) on the application toolbar. The add-in module 14 intercepts the 'send message' event and manipulates the message to redirect it to the central site 31 (shown in FIG. 3) if translation is required. The manipulated message is passed to the underlying message transport subsystem of the operating system 12. The message is then sent to the Internet for delivery to the central site and thereafter it is forwarded to the destination site.

Redirection of the message to the central site is accomplished by saving the original destination address within a 'user-defined' field within the message header and replacing it with the address of the central site. This operation is undertaken by the add-in module and thus is totally invisible to the user. At the central site once the message has been processed the saved destination address replaces the central site address and the 'user-defined' field within the message header is removed thereby returning the message to its original state before it was redirected to the central site. An example of this message manipulation operation to effect redirection is shown below:

Original message:
From: john.doe@company.co.uk
Sent: 1 Oct. 2002 17:35
To: pablo.munoz@company.es
Subject: Greetings
Thank you for your hospitality last week.

Redirected message:
From: john.doe@company.co.uk
Sent: 1 Oct. 2002 17:35
To: anonymous@translation-site.com
X-to: pablo.munoz@company.es
Subject: Greetings
Thank you for your hospitality last week.

Translated message:
From: john.doe@company.co.uk
Sent: 1 Oct. 2002 17:35
To: pablo.munoz@company.es
Subject: Saludos
Gracias por su hospitalidad la semana pasada.

The 'original message' is that created by the sender using their message preparation package. The 'redirected message' is that constructed by the add-in module and sent to the translation site. Note the addition of the 'X-to:' field to hold the original destination address and the original destination address (To:) replaced by the address of the translation site. Rather than the translation site address being a global access point (i.e. To: anonymous@translation-site.com) as shown in the above example, the address can be made user specific (i.e. To: john.doe@translation-site.com) to facilitate charging the user for services rendered. Once the message has been translated, the adjustments made to the message header are removed as shown in the 'translated message' before the message is forwarded to the recipient.

Although the primary embodiment of the invention covers redirection of email messages, it is not necessarily restricted to the email message protocol (see RFC822: Standard for the Format of ARPA Internet Text Messages, RFC2822: Internet Message Format plus RFC821/RFC2821: Simple Mail Transfer Protocol). Providing a message protocol supports 'user-defined' fields within the message header and fields are free-form in architecture then the redirection mechanism eluded to above can in principle be used to redirect messages using other protocols, not just email messages, for translation at a central site.

Figure 4:
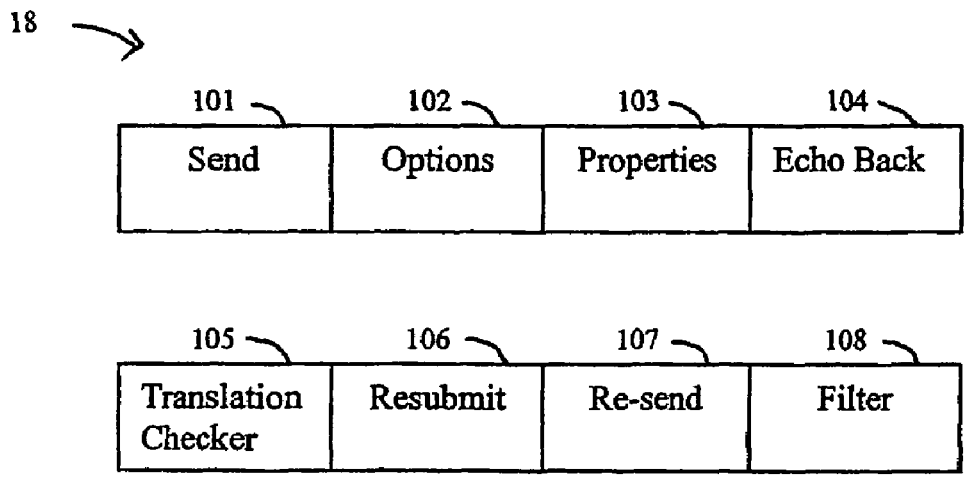
FIG. 4 shows a toolbar displayed on the sending system of FIG. 1.

Referring to FIG. 4, the toolbar 18 includes a number of buttons which may be, for example, added into the email client main toolbar area. These buttons are as follows. A send button 101 causes the system to send a message to the recipient. An Options button 102 allows a user to change a range of global options accessed through a number of different dialogues. A properties button 103 allows a user to modify many of the translation options but the changes will only be applied to the current message. An Echo Back button 104 allows a user to submit a message to the translation system 31 for trial translation whereupon information regarding problems encountered during the translation process is returned to the user. A translation checker button 105 allows a user to submit a message to the translation system 31 whereupon a list of recommendation for improving translation quality is returned. A resubmit button 106 allows a user who has been sent a message not in their native language to initially change the target language and thereafter pass that message through the translation process as many times as they like to improve the translation quality A Re-send button 107 allows a user to prepare for sending a message appearing within the user's inbox that is opened for viewing such as a message that has been received from a trial translation using the Echo Back button 106. A Filter button 108 allows a user to view those components of a message that are in their native language or display the complete message. The operation of some of these buttons will be described in more detail below.

It is preferable for the add-in to only provide additional behaviour and not alter existing methods of use or detract from existing behaviour manifested by the program to which it is being attached. For example, in the situation when the recipient is not found within the contacts list 10a whereupon information such as their language needs to be sought from the user. Implementing this requirement on the existing 'send message' button would clearly be altering program use and behaviour. However, the addition of a 'message properties' button 103 facilitates the entry of message specific information such as recipient language and other translation options.

Figure 2A:
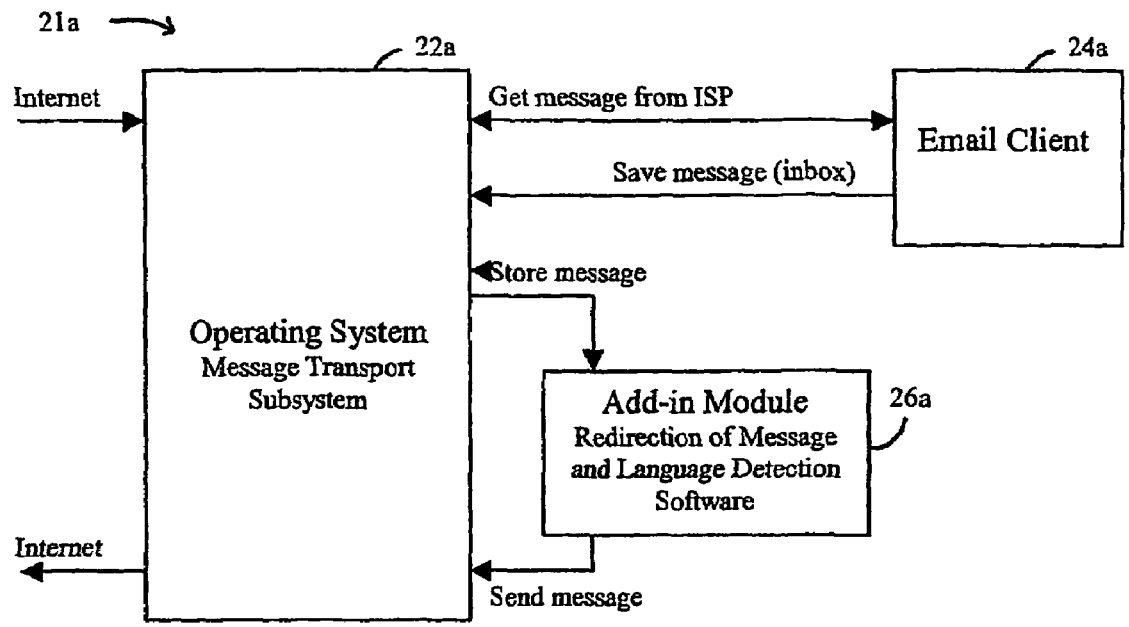
FIG. 2a and FIG. 2b are diagrams of a receiving system forming part of a communication system according to the first embodiment of the invention.

Referring to FIG. 2a, a receiving system 21a comprises an operating system 22a which includes a message transport subsystem, an email client 24a and an add-in module 26a which includes language detection software. When the email client 24a downloads a message from a remote server using the auspices of the operating system 22a, the message is saved into the recipient's inbox supported by the operating system 22a. The add-in module 26a responds to a 'store message' event generated by the operating system 22a and examines the message just saved. If the message requires processing it is removed from the inbox and a 'dummy message' left in its place informing the user that the original message requires translation. The add-in module 26a manipulates the message to effect redirection to the central site. The manipulated message is passed to the underlying message transport subsystem of the operating system 22a. Then the message is sent to the Internet for delivery to the central site where it is modified by means of translation and further manipulation. The modified message is then forwarded to a message box residing upon a remote server. The email client 24a downloads the modified message from the remote server using the auspices of the operating system 22a, whereupon the modified message is saved in the inbox supported by the operating system 22a. From the inbox, the message can be accessed for display, for example on a PC screen. The add-in module 26a responds to a 'store message' event generated by the operating system 22a and examines the message just saved. The add-in module 26a upon recognising the stored message as a modified message, removes extra fields placed into the email header by the central site. The modified message is then returned to the recipient's inbox. From the inbox, the message can be accessed for display, for example on a PC screen.

Figure 2B:
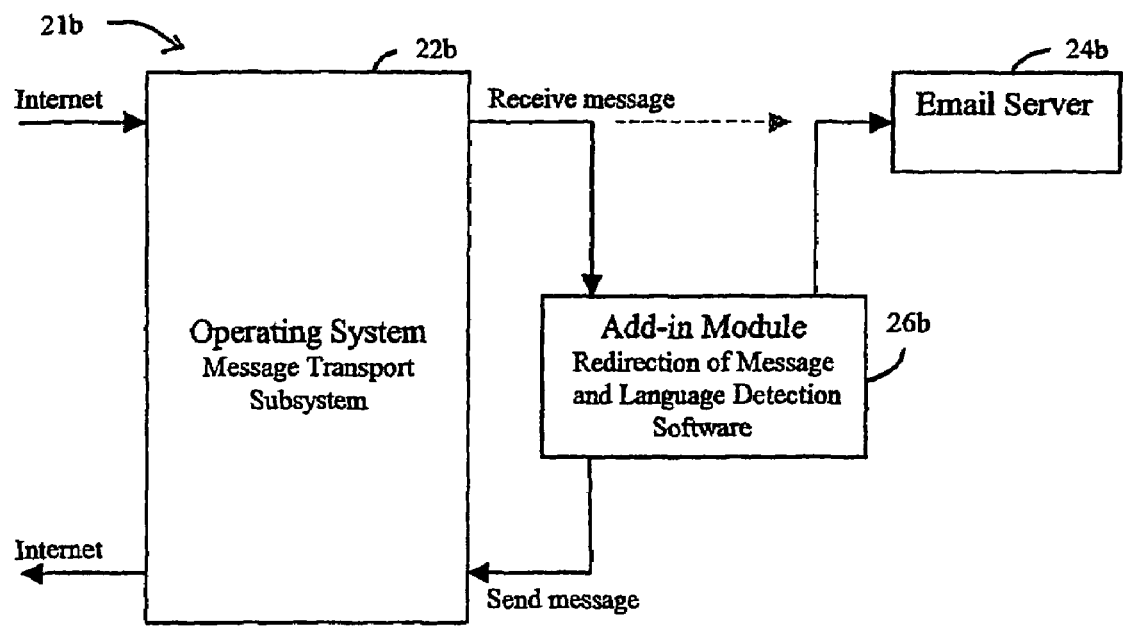

Referring to FIG. 2b, a further receiving system 21b comprises an operating system 22b which includes a message transport subsystem, an email server 24b and an add-in module 26b which includes language detection software. When a message is received from the internet, the operating system 22b generates a 'receive message' event in response to receiving a message. The add-in module 26b intercepts the 'receive message' event (that otherwise would have gone to the email server) to check if message processing is required, and if it does the add-in module 26b manipulates the message to effect redirection to the central site. The manipulated message is passed to the underlying message transport subsystem of the operating system 22b. Then the message is sent to the Internet for delivery to the central site where it is modified by means of translation and further manipulation. The modified message is then returned whereupon it received again by the operating system 22b from the Internet, and the operating system generates a 'receive message' event in response to receiving a message. The add-in module 26b then intercepts the 'receive message' event and, upon recognising the received message as a modified message, removes extra fields placed into the email header by the central site. The modified message is then forwarded to the email server 24b whereupon it is placed into the recipient's inbox for access and display by the recipient.

Figure 3:
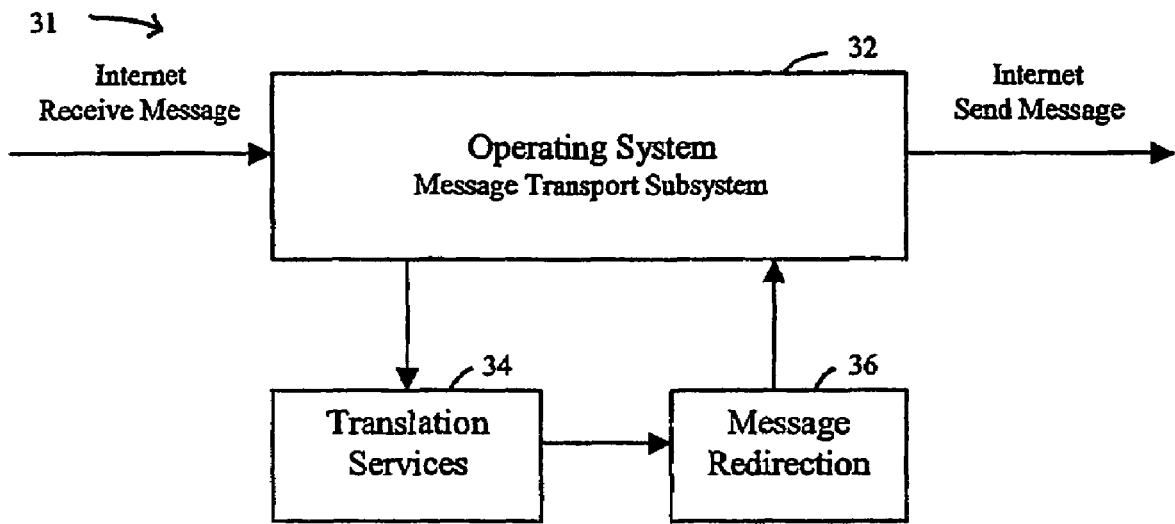
FIG. 3 is a diagram of a translation system forming part of a communication system according to the first embodiment of the invention.

Referring to FIG. 3, the translation system 31 is located at a central site remote from the sender and the receiving computer systems, and comprises an operating system 32, a translation module 34, which includes its own dictionaries, and a message redirection module 36. The translation system 31 also includes a number of on-line dictionaries that can be accessed and viewed by a user through the Internet portal of the central site. When a message is directed to the translation system 31 from either the sending system 11 or the receiving system 21a or the receiving system 21b the message is passed to the translation module 34, and from there to the message redirection module 36 where the central site address is replaced by the destination site address within the message header. The translated message is then passed to the underlying message transport subsystem of the operating system 32 and sent to the Internet for delivery to the destination site.

Figure 5:
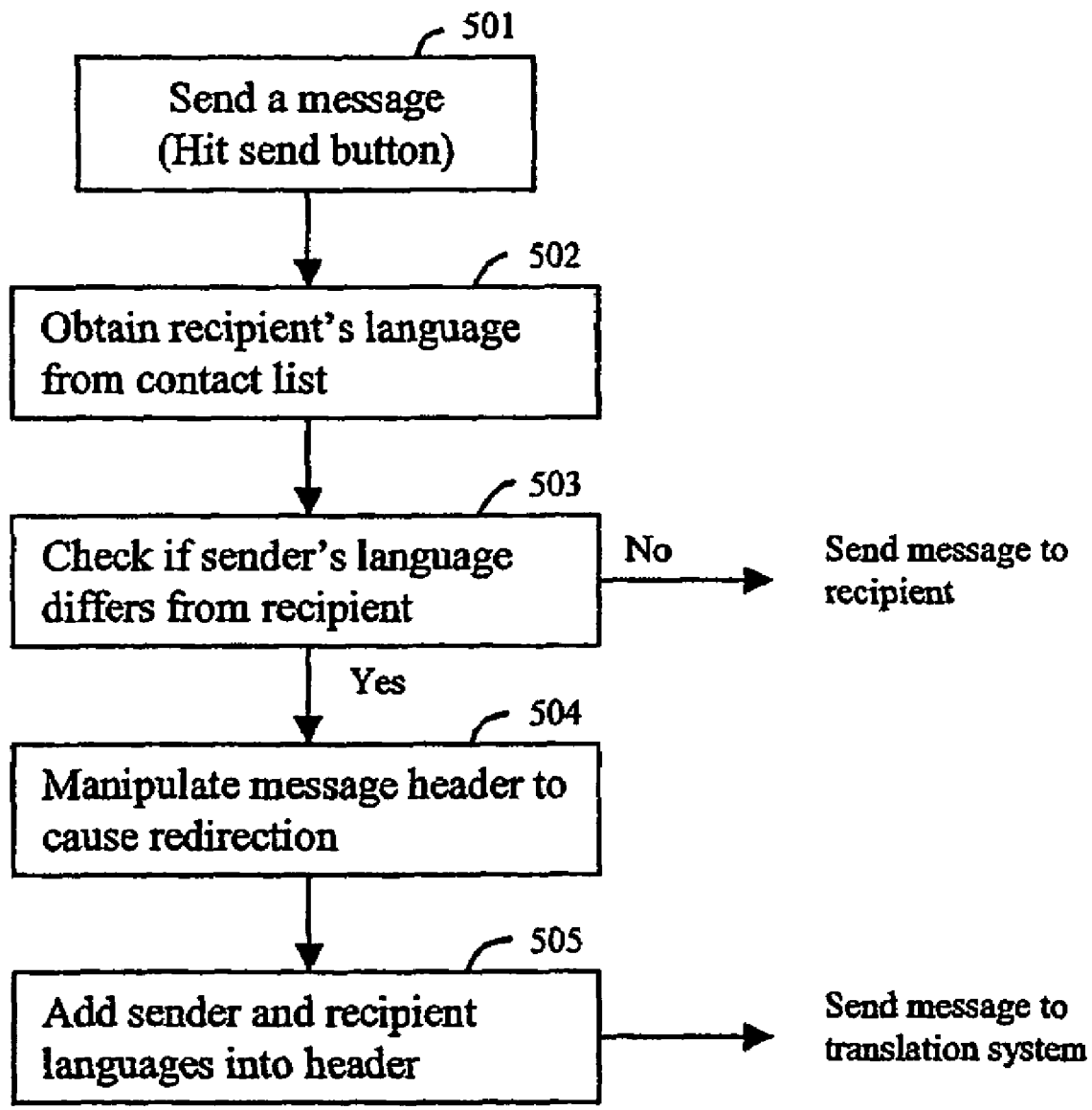
FIG. 5 is a flow diagram showing a first mode of operation of the sending system of FIG. 1.

FIG. 5 provides an overview of the tasks performed in redirection of messages at the sender's end of the communication link, i.e. in the sending system of FIG. 1. A message is sent through use of the 'send message' button 101 on the toolbar 18 or through selection of a corresponding menu option. Either route causes entry into the 'send message' event handler 501 where the first task is to obtain the recipient's language from the contacts list 10a, as shown in the diagram at step 502. Comparing the sender's language with that of the recipient at step 503 determines whether redirection of the message to the central site 31 for subsequent translation is warranted. Assuming that translation is not required then the message is left intact otherwise the destination address in the message header is altered at step 504 to effect redirection to the central site 31 and the original recipient's address saved within the message header. Finally the sender and recipient languages are added to the message header at step 505.

Figure 6:
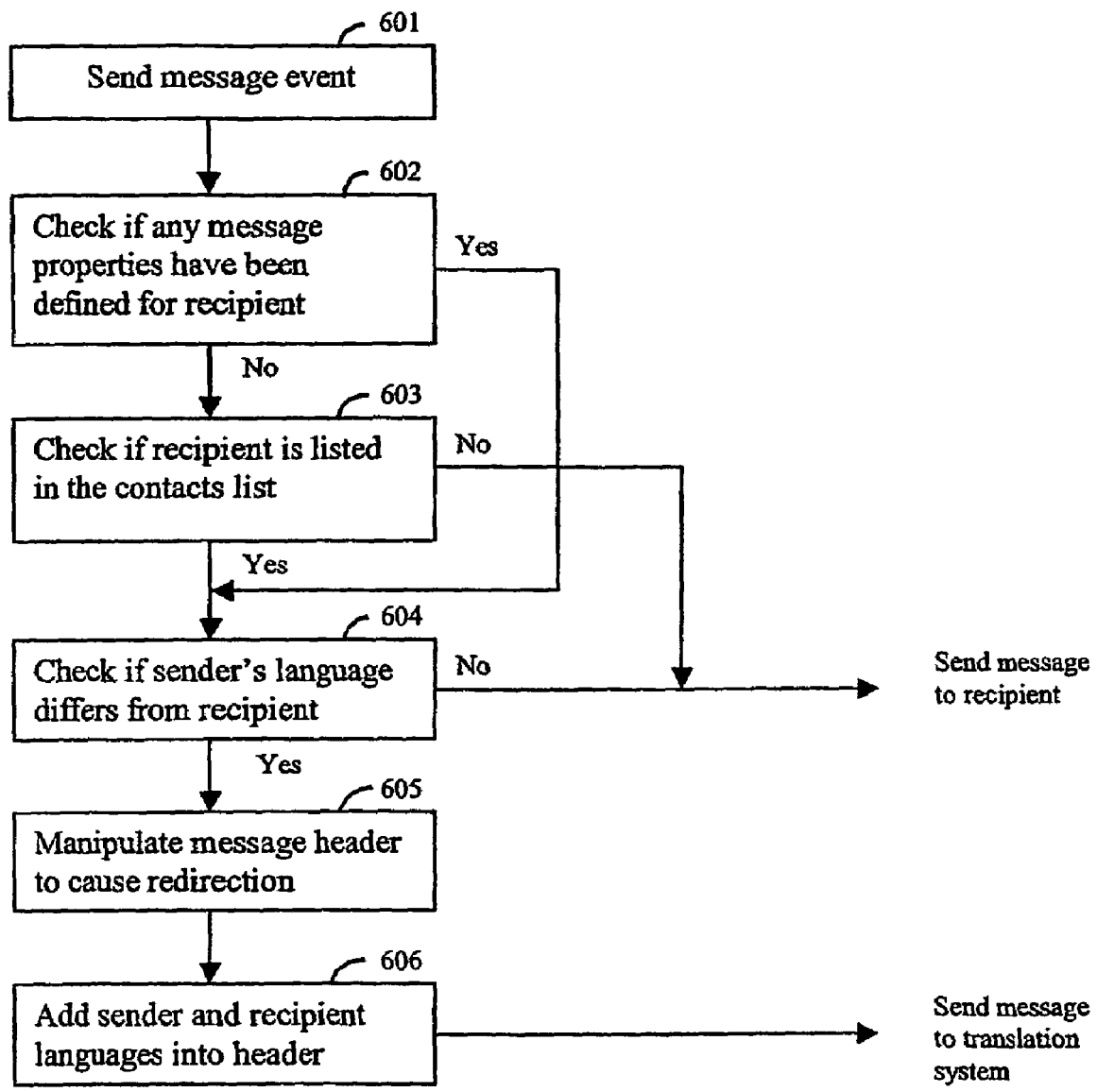
FIG. 6 is a flow diagram showing a second mode of operation of the sending system of FIG. 1.

The above simplified view of the tasks performed in the 'send message' event handler assumes that the recipient exists within the contacts list 10a; however this will not always be the case. Under the circumstance that the recipient does not exist within the contacts list 10a or their preferred language has not been pre-defined then when the 'send message' button 101 is used the message will be sent directly to the recipient. However, if the 'message properties' button 103 is used prior to the 'send message' button 101 then this causes a dialog to be displayed whereupon requested information about the recipient can be entered. If the recipient's language differs from that of the sender then pressing the 'send message' button 101 redirects the message to the translation system 31. The actions taken in the 'send message' event handler are illustrated in FIG. 6. The first two steps 602 and 603 correspond with the first step 502 in FIG. 5. Then, at step 604*a* check is made whether the sender's language differs from the recipient's language. If not, then the message is sent to the recipient. If it is different, then the message header is manipulated to cause redirection of the message at step 605, and the sender and recipient languages are added to the message header at step 606. The message is then sent to the translation system 31 for translation.

If the 'message properties' button 103 is not used prior to sending the message then the steps taken in FIG. 6 are basically those illustrated in FIG. 5. Assuming that the 'message properties' button 103 is used then any information previously defined for the recipient may be overridden for the current message only or previously undefined information added by the user. When the 'send message' button 101 is used then the 'send message' event handler uses information from the 'message properties' to action the sending of the message.

Figure 7:
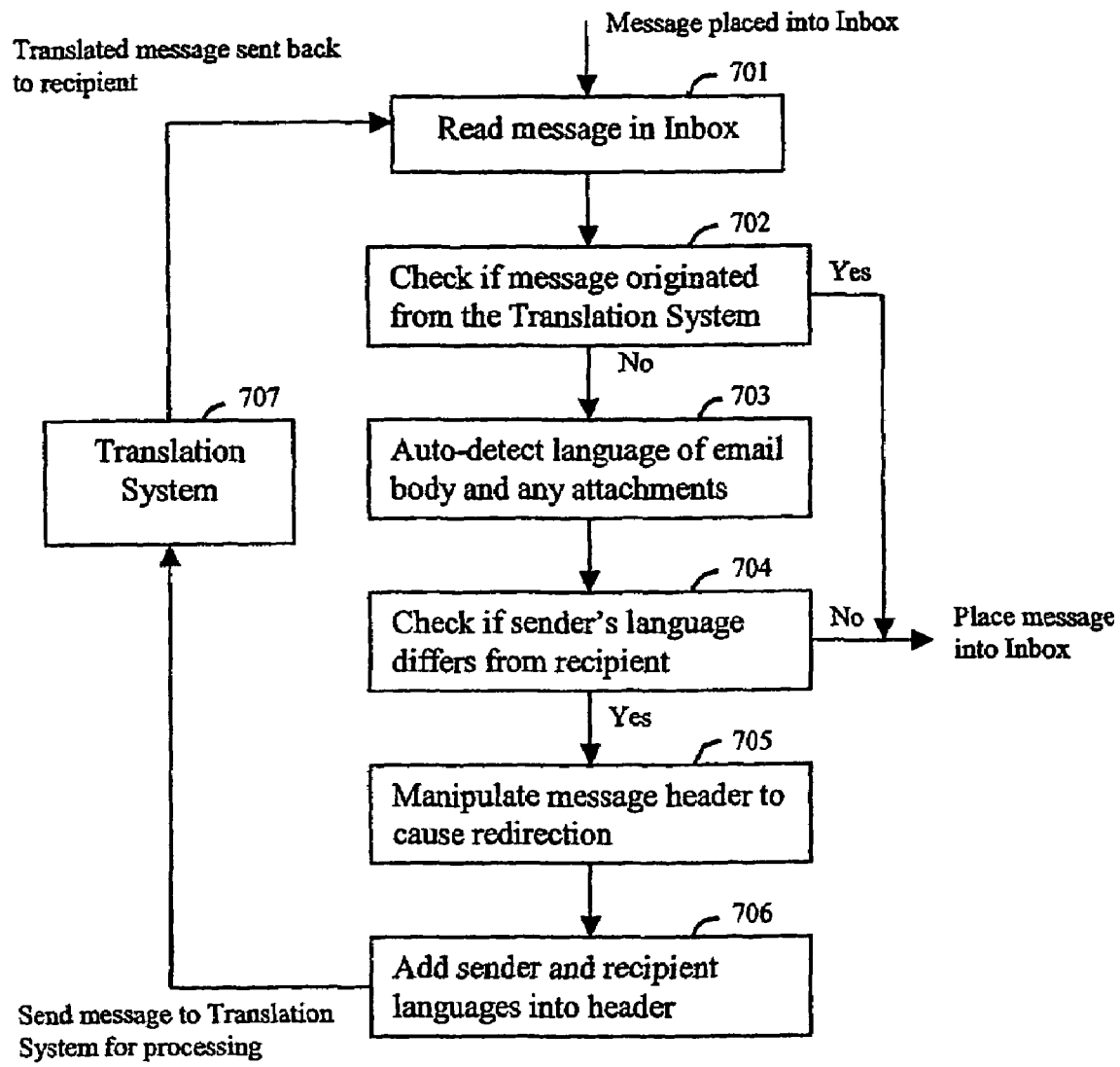

FIG. 7 provides an overview of the tasks performed when redirection of messages is undertaken by an add-in module resident upon the recipient's system i.e. in the receiving system 21*a* of FIG. 2*a*. The message is read from the recipient's inbox at step 701. The message is then checked at step 702 to see whether it originated from the central site 31. If the message did not originate from the central site, the sender's language has to be ascertained at step 703 by performing automatic language detection upon the message text. An example of the methodologies used for performing automatic language detection is described in "Comparing Two Language Identification Schemes by Gregory Grefenstette, 3rd International Conference on Statistical Analysis of Textual Data, Rome, Dec. 11-13, 1995". The sender's language is then compared with the recipient's language at step 704 to establish whether translation is warranted. Assuming that both sender and recipient languages are the same then the message remains within the inbox for access by the user. However, if translation is required then the message header is manipulated to effect redirected at step 705 and sender plus recipient languages are added to the message header at step 706 in a similar strategy to that employed at the sending end of the communication link. The message is then sent to the translation system 31 for translation at step 707. Once the message has been translated by the translation system 31 it is returned to the recipient whereupon information placed into the message's header by the translation system 31 is used to indicate a translated message and thereby bypass the necessity to perform automatic language detection. This additional information is removed before the message is returned to the recipient's inbox.

It is recognised that quality machine translation is limited in the number of language pairs currently available and these are centred upon a few 'core' languages, notably English and French. These core languages may be translated into a number of major European languages such as German, Italian, Portuguese and Spanish, however support for say German into Spanish or Italian into Portuguese is currently not available. It is appreciated that some translation engines reportedly support a large number of language pairs however they are relatively unsophisticated using table look-up techniques that results in poor quality translation. Furthermore, the core language supported is invariably English. Until every language can be machine translated into any other with a high degree of quality then the proposed system needs to cope with a restricted number of language pairs. The user's language is split into first and second preferences along with a default language. Initially, the user's first preference language is used to determine the language pair for translation and if this particular pair is currently not available then their second preference is used, otherwise the default is used. In this manner the system attempts to find a language pair for the translation. It is appreciated that having to split a user's language into first and second preferences along with default language is a facet of the restricted number of quality language pairs currently available. The need for this feature will lessen over time as more and more language pairs are added to the central site.

When a message is redirected upon the recipient's machine to the translation system 31 it likely to take some appreciable time before that message is returned due to Internet traffic and workload upon the translation system 31. In contrast, if redirection were performed upon the server supporting the user's mailbox then the delays incurred in redirecting a message to the translation system 31 are totally masked from the user.

Figure 8:
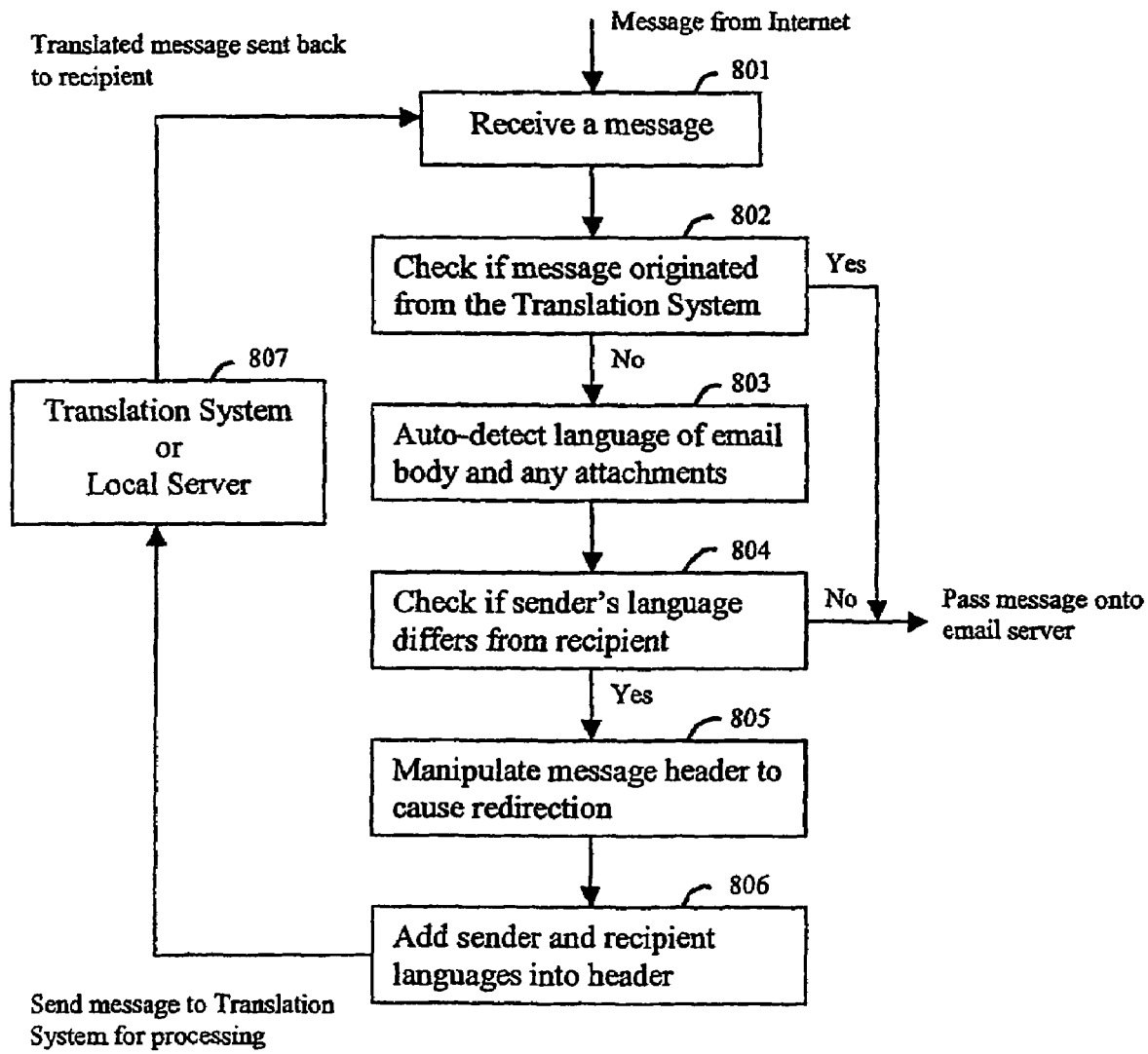
FIG. 8 is a flow diagram showing a mode of operation of a modification of the receiving system of FIG. 2b.

FIG. 8 provides an overview of the tasks performed when redirection of messages is undertaken by an add-in module resident upon an email server at the recipient's end of the communication link i.e. in the receiving system 21*b* of FIG. 2*b*. The steps in FIG. 8 mirror to a great extent those undertaken in FIG. 7 and thus are given corresponding numbers increased by 100.

It is apparent that interception of messages at the recipient end of the communication link either upon the recipient's system (system 21*a* and FIG. 7) or using a local email server (system 21*b* and FIG. 8), are very similar. Upon the recipient's system, the email client sends requests to a remote server for information about messages it holds in the user's message box. Subsequently, individual emails are downloaded from the server to the user's machine using either the POP3 protocol (see RFC1939: Post Office Protocol—Version 3) or the HTTP protocol (see RFC2616: Hypertext Transfer Protocol—HTTP/1.1) or a section of a message or complete message using the IMAP4 protocol (see RFC2060: Internet Message Access Protocol—Version 4rev1). To re-iterate, events fired by the low-level messaging system may not necessarily indicate the arrival of a complete message. Rather they will indicate some sub-part of the message has arrived. Thus, not until a message or part of a message is placed into the local inbox can the add-in module react to any message events. In contrast, upon a local email server, an event will be fired by the low-level messaging system to notify those modules interested in receiving such notifications that a message has arrived. This 'receive message' event can occur at any time and signifies arrival of a complete message. The add-in intercepts the 'receive message' event before the email server allowing it to determine whether a message requires processing by the central site. Otherwise the event is passed onto the email server so that it can handle the incoming message.

An email message consists of a header containing addressing information followed by a body containing the message text. For simple messages the email body can consist only of the message text and nothing else. For more complex message containing attachments for example, then the email body is structured using the MIME protocol (see RFC1521/RFC1522: Multipurpose Internet Mail Extensions). MIME is a protocol used for encapsulating different items of information within the email body covering for example plain text, formatted text, graphics and audio/visual information. A simple MIME message is shown below:

```
From: sendername@company.com
Sent: 1 Oct. 2002 17:35
To: receivername@company.com
Subject: An example of a multipart MIME message
MIME-Version: 1.0
Content-Type: multipart/mixed;
     boundary= unique-boundary-1
This is the preamble area of a multipart MIME message.
Mail readers that understand multipart format should ignore this preamble.
--unique-boundary-1
Content-Type: text/plain
This is the email message text
--unique-boundary-1
Content-Type: text/plain;
Content-Disposition: attachment;
     filename="test.txt"
This is the attachment text
--unique-boundary-1
```

The MIME protocol compartmentalises information into an arrangement of body parts and sub-body parts. A specific boundary marker is used to block each part and information at the front of a body part indicates the nature of its contents. The above example shows an email messages containing a single line of text plus an attachment. The central site needs to handle MIME formatted email messages so that each body part is recognised and translation undertaken only on some body parts, as described below. Furthermore, MIME sub-body parts are used to handle the complexities of handling replying and forwarding of email messages, as described later in this document. Although this embodiment of the invention uses the features and facilities of the MIME protocol to package both original text and translated version, the invention is not limited to this protocol. Any protocol that supports structured storage of messages along with application definable descriptors could potentially be used by this invention to encapsulate the un-translated and translated message components.

Figure 9:
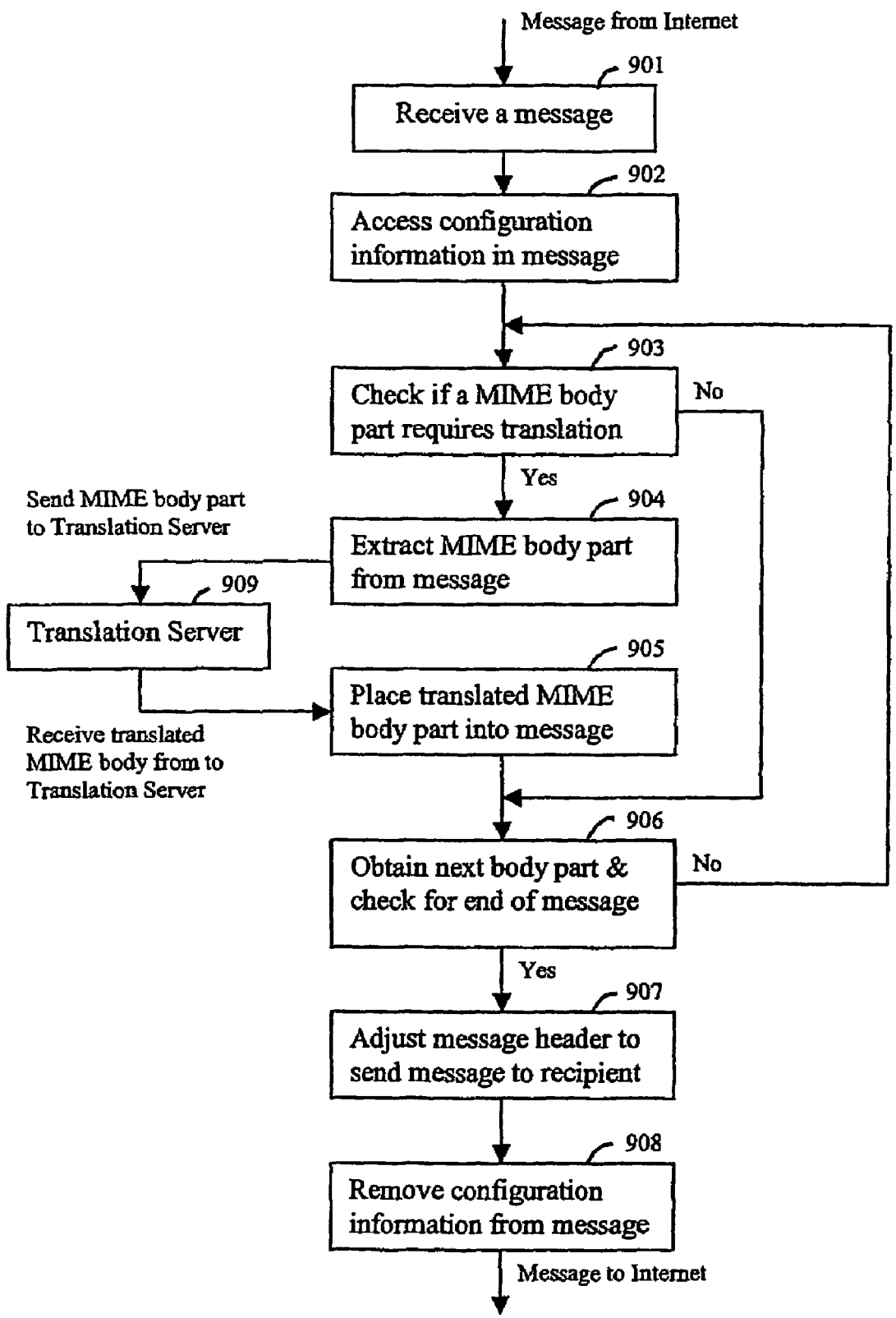
FIG. 9 is a flow diagram showing operation of the translation system of FIG. 3.

FIG. 9 illustrates the tasks performed by the translation system 31. Upon receiving a message at step 901, and accessing the configuration information in the message at step 902, the translation system 31 scans the first of the MIME body parts at step 903 to identify whether it needs translating. Details of the content of the message will be described in more detail below. Information extracted from the message header along with translation parameters placed into a dedicated MIME body part is used to control the translation process. Each MIME body part that requires translation is extracted from the message at step 904 and presented to the translation server 909 whereupon it is translated and returned to the message at step 905. A check is made at step 906 to determine if any more MIME body parts require translating whereupon steps 903 to 905 plus step 909 are repeated. Once the translated message has been fully constructed and the end of message detected at step 906, information in the message header is altered at step 907 to remove information relating to redirection to the translation system 31 and additional fields placed into the header by the add-in module for use by the translation system are also removed at step 908. The message is then forwarded to the recipient.

For the sake of clarity FIG. 9 omits to show that when a message contains many MIME body parts it is likely that only the first few body parts require translation as the remainder may have previously been processed during a reply or forward situation, as will be described below. Also, information attached to the message by the add-in module for use by the translation system 31 to control the translation process can subsequently be discarded before the translated message is forwarded to the recipient. These items are also describe below and only serve to 'optimise' the translation process and do not detract from the fundamental tasks undertaken during processing of a message by the translation system 31.

In another aspect of the invention the system can be extended to handle secure messaging covering both encrypted messages and messages delivered through a secure network or a combination of both. The RFC821/822 and RFC1521/1522 protocols used to send messages over the Internet do not provide a secure delivery system and messages can be intercepted and viewed by someone other than the intended recipient or recipients. This weakness can be addressed through the use of public-key infrastructure (PKI) and virtual private networks (VPN) technologies. Either or both technologies can be used to secure message delivery across the Internet.

Support for secure communication can be provided through the creation of messages using the Secure/Multipurpose Internet Mail Extensions or S/MIME protocols (see RFC2632: S/MIME Version 3 Certificate Handling, RFC2633: S/MIME Version 3 Message Specification and RFC2634: Enhanced Security Services for S/MIME) along with the use of digital certificates (see RFC2459: Internet X.509 Public Key Infrastructure, Certificate and CRL Profile). A user wishing to use encrypted communication is required to register their intention with the central site whereupon a digital certificate is obtained from a trusted certificate authority. The public-key is sent to the user and the private-key is kept in a secure area on the central site. A user encrypts a message using their public key of the digital certificate whereupon only the private key held by the central site will decrypt that message. Encrypted messages are queued on the central site in their S/MIME format and the program that decrypts the message before presenting it to the translation server runs in its own secure environment whose access privileges will be restricted to a very few individuals. Consequently, not even the central site maintenance personnel who are likely to have administrative privileges to support the site will be able to access any secure message.

Once a message has been translated it needs to be encrypted before being sent to the recipient. Using the sender's private-key is not an option as this would result in an unsecured message being sent to the recipient since anyone with the public-key (including the recipient) can decrypt that message. If the recipient is to participate in the secure communication then they need to posses a digital certificate of their own so that the central site can use their public key to encrypt the message whereupon only the recipient can decrypt that message. Clearly, if the central site cannot obtain the public-key of the recipient because they don't posses a digital certificate then the central site cannot process the encrypted message. Under this circumstance, the central site has to deliver a message to the sender indicating the reason why it cannot process their secure message.

Prior to embarking upon secure communication, the sender can contact the recipient using plain-text messages to ensure that the recipient has access to a digital certificate and that their public key at some stage is lodged with the central site. Thereafter, secure communication between the two participants can then be undertaken. Within a corporate environment the digital certificate can belong to the company or a particular site within an organisation. Alternatively, there is little to prevent an individual from obtaining their own digital certificate as cost is unlikely to be a prohibiting factor. More importantly, the issue is one of familiarity with the digital certificate technology and the organisations through which they can be obtained are important factors. Since the central site needs to establish a relationship with a trusted certificate authority to obtain digital certificates on behalf of the sender, then the central site can be the conduit through which the recipient obtains a digital certificate or is provided with information where such items can be obtained. No matter by what route a recipient gains access to a digital certificate as long as the central site has access to their public-key then secure communication is possible.

It is worth noting that secure communication using PKI technology relies upon the recipient having a digital certificate. The fact that the central site is a conduit within the communication path does not alter this fundamental requirement of the technology.

Another approach to secure communication is through the use of virtual private networks (VPN). The fundamental principle embodied in the VPN concept is that rather than incurring the considerable expense of establishing a secure private network, a message is automatically encrypted before being sent over a public network such as the Internet. VPN relies upon establishing a secure point-to-point link between two nodes. This secure link is known as a 'tunnel' and is the conduit through which a plain-text message presented at one end of the tunnel is automatically encrypted before being sent through the tunnel whereupon at the receiving end the message is decrypted before being presented to the recipient. The nodes providing the encryption and decryption may be contained within the firewall that isolates an organisation's internal network from the outside world. Since point-to-point communication links are being established, a VPN node requires setting up to define those IP addresses it is going to contact and those it will accept contact from.

The central site can provide VPN capability to selected customers whereby their existing VPN nodes are configured to allow communication to be redirected to the central site and to accept communication originating from the central site. Under these conditions the central site becomes part of that customer's VPN and as such is able to process messages from that customer.

Implementing a VPN connection requires knowledge of the IP addresses of those nodes constituting the VPN (i.e. from sender to central site and central site to recipient) so that the communication traffic is appropriately routed. Because VPN establishes a point-to-point link between two notes the global Domain Name System (DNS) of the Internet cannot be used to convert textual addresses to IP addresses, this will have to be done locally on the central site. Thus, the central site supports its own DNS capability for VPN customers. When a VPN environment is set up for a customer on the central site the IP addresses of each VPN node that forms part of the customer's communication network are registered with the DNS environment on the central site. Once this has been done then the RFC822 message header fields are manipulated as part of the redirection mechanism and can be translated by the TCP/IP communication layer into the appropriate IP address and hence routed out on the correct VPN link to the recipient.

While the embodiments described above indicate how the invention can handle secure communication using two major technologies currently in use by the computer industry, it will be appreciated that other suitable technologies can also be used.

As an example of an implementation of the present invention, its integration into Microsoft Outlook™ will now be described. Outlook has been chosen because of its widespread use within the computer industry; however the invention is not restricted to this particular email program or to the Microsoft Windows™ operating system upon which this application runs. The invention can equally be applied to other email programs such as Netscape™, Eudora™ and Lotus Notes™ and to other operating systems such as Unix and Linux.

Implementation of the translation system on the users system takes the form of an add-in module, as already described above. Once installed, a user will be reminded to update their contact list entries for those persons whose language differs from that of the user. Adding the recipients' language into the contact list will enable the add-in module to automatically decide if the email needs redirecting to the translation system 31 for translation without any intervention required of the user. All the user has to do is hit the Send button as normal.

In the situation where the recipient's language has not been defined in the contacts list then are two possible options:
 1) By pressing the Send button 101, email is sent directly to the recipient without translation.
 2) A pop-up dialog appears which prompts the user for various items of information covering such items as the recipient's language and which dictionaries ought to be used for translation. Once the required information has been entered, only then can the email message be routed to the translation system 31 for translation and then forwarded to the recipient.

Since it is preferable for the add-in module not to change any existing behaviour but to provide additional features and facilities, then the above courses of action would appear to be at odds with each other if they were to be invoked from the existing 'send email' button.

However, if the information appearing on the pop-up dialog is perceived as properties of a message then a distinction can be made between the requirement to view and update information necessary to control message redirection to the translation system 31 and its subsequent translation, and the action of actually sending that message. Thus the toolbar 18 needs to contain a 'message properties' button alongside any other buttons (e.g. option & configuration buttons). The following indicates the purpose and actions associated with both the 'message properties' button 103 and the existing Send message button 101:
 1) 'message properties' button 103
    A pop-up dialog will be displayed where pre-existing information can be modified (i.e. global configuration information) and other information that has not yet been specified can be added (i.e. recipient's language if missing from the contact list). Hitting the CANCEL button at the bottom of the dialog will discard any modifications made whereas selecting the OK button indicates acceptance of any changes and the message properties will be updated accordingly.
 2) Send button 101
    The purpose of this button is not changed by the presence of the add-in module 14 in that it causes an email to be sent to the Internet for delivery to the recipient. However, if there is additional information pertaining to redirection or the translation process then the add-in module 14 will act upon this information accordingly. Alternatively, if no such information exists for whatever reason then the email message is sent unadulterated out to the Internet.

To illustrate the behaviour and actions associated with both the 'message properties' and 'send message' buttons, then the following scenarios can be considered:
 1) A message is being sent to a recipient that is not currently defined in the contacts list. Hitting the Send button will cause that message to be sent to the recipient without modification. However, if the 'message properties' button is selected first then the user is given an opportunity to specify the recipient's language, translation dictionaries plus any other pertinent information. Thereafter hitting the Send button, the message may be redirected to the translation system 31 if sender and recipient languages differ.

2) The recipient is already defined in the contacts list but no language is specified then hitting the Send button will cause that message to be sent to the recipient without modification. However, if the 'message properties' button is first selected and the recipient's language is defined on the pop-up dialog, then hitting the Send button may cause message redirection if sender and recipient languages differ.

3) The recipient is already defined in the contacts list 10*a* along with their language. Hitting the Send button may cause message redirection if sender and recipient languages differ. Furthermore, prior to sending a message, if the 'message properties' button is selected, then the recipient's language taken from the contact list 10*a* can be changed (just for this message) along with any other pertinent information. Thereafter, the Send button will cause the message to be sent out to the Internet.

Treating information necessary to control redirection of a message to the central site plus that needed to direct the translation process as properties of a messages means that the action of sending a message is totally disconnected from the tasks of viewing and updating this information. Moreover, since these 'message properties' is additional information then existing email client behaviour is not changed. Finally, the most important aspect of all is that the pre-existing Send message button is the only one that actions sending of messages to the Internet.

The 'message properties' pop-up dialog will need to display a list of all recipients and their associated language (if any have been previously specified in the contacts list) along with the translation options. The amount of information presented will probably require more than one dialog with for example the most commonly altered items appearing on the initial dialog and the least often modified items on subsidiary dialogs. Some of this information will relate to the whole message whilst other items will only affect individual components of the message.

The purpose of the pop-up dialog is to view 'message property' information and make any necessary changes. Since the information presented relates only to the current message then any changes made on the pop-up dialog to pre-existing information such as the recipient's language obtained from the contacts list has to leave that existing data unchanged. Thus, the pop-up dialog provides an opportunity to override pre-existing information or supply new information for the current message only.

The system is arranged to send the communication to a first group of main recipients, identified in a To: list, a second group of recipients who are not the main recipients, but who are to receive a copy of the communication and to be identified to the each other and the main recipients, identified in a Cc: list, and a third group of recipients who are to receive a copy of the communication but are not to be identified to the other recipients, identified in a Bcc: list. In the situation where an email is being sent to more that one person (multiple To:, Cc: and Bcc: entries), then a single SMTP message can be created covering all recipients in the multiple To: list, Cc: list, and individual messages for each recipient in the Bcc list. However, re-routing messages to the translation system 31 based upon this arrangement is likely to create duplicate translation work for the translation system 31 since some of the recipients are likely to have the same language. Thus, the add-in sends a single message to the translation system 31 where translation for a single language pair is performed once and only then can multiple To:, Cc: and Bcc: recipient processing be undertaken. Using an 'user-defined' field (X-RECIPIENT-LANGUAGE), the add-in module will place the language of each recipient into the email header in the same order as they appear in the recipient list. Thus, if multiple entries within the To:, Cc: and Bcc, fields where such that a message is being sent to a Spanish, German, Spanish and French speaking persons, then the 'recipient language' list would appear as follows:

x-recipient-language: es, de, es, fr

The translation system 31 can sort the above 'recipient language' list to optimise the translation process whereupon the original list is matched against the multiple recipients to dispatch the translated message to the corresponding individuals.

The translated version of an email body will be pre-pended onto the original email with a delimiter separating the two versions. Since the translated version is the more important of the two email bodies sent to the recipient then placing it first is fundamental. For attachments, it is at the discretion of the sender whether an attachment is translated, however when translation is indicated the translated version will appear before the original within the message.

At the central site, a message is broken into its constituent parts for processing whence the modified parts are reassembled into a new message for delivery to the recipient or recipients. When multiple recipients are involved then all those encountered in the To: and Cc: fields can be handled by a single message being dispatched (any entries in the Bcc: field being removed). However, for those listed in the Bcc: field then a separate message needs to be created for each recipient in that list with only one recipient in the Bcc: field appearing in the output message each time. Once all recipients have been processed then the translated message components can be discarded.

Implementing message redirection at the recipient's end of the communication link can be undertaken either upon the server supporting the recipient's mailbox or on the client system but not in both locations. It is less intrusive to intercept a message for redirection at the server before being placed into the recipient's mailbox since the user has no awareness of the arrival of any message on the server until they access their mailbox using an email client. In contrast, intercepting a message upon the client system may result in one or more messages being redirected to the translation system thereby resulting in fewer messages appearing in the user's local inbox than that reported at the beginning of the download operation from the server. This difference dictates the nature of the resulting implementation, as described in the following sections.

For users connected to an Internet Service Provider (ISP) providing a messaging capability using the ISP's servers, through a remote link then intercepting messages for redirection can only sensibly be performed upon the users system (client system). Here messages are requested from the ISP using POP3, IMAP4 or HTTP protocols which means responding to receive message events as a result of the ISP's server responding to protocol commands. Unlike upon a server where the messaging subsystem handles all aspects of incoming SMTP traffic and triggers events in response to receiving unsolicited messages, Outlook implements POP3/IMAP4/HTTP protocols by directly communication with the ISP server through a socket and the messaging subsystem (MAPI™) is only used to provide managed storage for the messages received. Consequently, there are three locations where the add-in module might respond to incoming messages and these are:

1) Socket interface

Attempting to intercept incoming messages at this interface raises two problems; firstly an ability to intercept traffic coming through the socket so that the add-in could take action before the information was passed onto Outlook and secondly the add-in would need to be conversant with POP3, IMAP4 and HTTP protocols to recognise data as against messages being returned from the ISP server.

2) MAPI events

The MAPI subsystem handles reception of messages, queuing of messages plus storage in a structured manner (i.e. message inbox). The add-in module can register with MAPI to receive a notification when a message is received as well as placed into storage.

3) Outlook Events

When one or more messages have been received by the system Outlook triggers the NewMail event whereupon the add-in can examine the inbox for newly received message and take the appropriate action.

Of the three possible places where the add-in might interject itself and thereby respond to incoming messages, the complexities of intercepting incoming messages at the socket interface can be implemented but, as already explained, the problems arising means this is not the preferred embodiment of the invention. The Outlook's NewMail event is only triggered after all messages have been received. Consequently the add-in module could not intercept an individual message for processing. Rather it would have to open up all the messages that had been received. For this reason intercepting incoming messages using the Outlook NewMail event could be implemented but it also is not the preferred embodiment of the invention. In contrast to the previous two embodiments of the invention, MAPI events are simple to set up and an event is triggered for each message received. Moreover, another facet that needs to be taken into account is that the add-in needs to have an active communication link to the Internet in order to redirect a message to the central site for translation. For users with a permanent 'always on' Internet connection such as ADSL or a leased line this is not an issue since their connection to the Internet will always be active. However, for those uses with a dialup link to the Internet this needs to remain active until the add-in has processed all those messages requiring translation. Any possibility that the link might be terminated before the add-in has completed its tasks needs to be avoided. For this reason, the WIN32™ function RasCustomHangUp( ) or equivalent needs to be implemented so that any attempt to disconnect the dialup link can be suspended until such time that the add-in has completed its tasks. For all the reasons stated above use of the MAPI folder event is the preferred embodiment of the invention.

In the POP3 and HTTP protocols, the client system is able to interrogate the ISP server for the number of messages currently being held whereupon the client system then downloads each message into a local inbox. Outlook upon its status bar displays the number of messages held by the ISP server before the download operation commences and shows which message in sequence is currently being downloaded. Thus, if one of these messages happens to be redirected by the add-in module then the user may notice that not all of the messages have been delivered. To overcome this issue the add-in module needs to provide a replacement for the redirected message indicating the reason for its apparent loss and that a translated version will be available probably the next time Outlook examines the message box upon the ISP's server.

The IMAP4 protocol is considerably more flexible in comparison to POP3 and HTTP, providing facilities to download specified sections of a message, the complete message or some arbitrary part given a start location and length of text as well as an ability to peek at a message without removing it from the server. Using some of these facilities Outlook peeks at the message header and places an indication into the inbox highlighting the messages existence but leaves the message intact upon the server. A user can view the short-form of the message and leave it intact upon the server, elect to download it by opening up the message or elect to delete the message from the message box residing upon the ISP's server without opening and downloading it. Thus, only when the user downloads the complete message will the add-in module intercept that message whereupon it may be redirected to the central site for translation.

When Outlook accesses information from an ISP using the IMAP4 protocol it is normally only the message header that is displayed on the users system. If the user chooses to download the message and the message needs translating, the message is automatically redirected to the translation system for translation in exactly the same manner as for POP3/HTTP email servers. At some indeterminate time later the translated message would be delivered to the message box upon the ISP server.

For users with their own servers providing messaging capability such as Microsoft Exchange™ a different approach can be used. The least intrusive approach to processing messages at the recipient end of the communication link is to intercept a message before it reaches the local email server and is placed into the recipient's inbox. This can be accomplished by hooking into the low-level event mechanism of the underlying message transport environment of the operating system running upon the server. This can easily be implemented by those skilled in the art of computer programming. This will require setting of privilege levels and filter specifications such that the add-in module allows virus checkers to be invoked first to certify a message as being clean but before the email server is notified of an incoming message.

For both users with their own messaging servers and users using a remote connection to an ISP's messaging servers, upon receiving an incoming message, auto-language detection needs to be performed upon the email contents and any attachments whereupon if this differs from the pre-defined 'destination' language then the message requires redirection to the translation system 31. After the translation system 31 has processed the message it is then be sent back whereupon information added into the header by the translation system 31 is used to quickly identify its origin and thereby saving processing normally undertaken upon incoming message to determine if redirection is necessary. The information within the header specific to the translation system is removed and the email passed onto the email server whence the message is processed like any other and placed into the recipient's inbox.

Details of how messages are constructed to allow for replying and forwarding will now be described. Firstly the situation will be considered where two users enter into a correspondence by replying to each other's email message. Normally, the reply is placed at the beginning of a message followed by the original text and the resultant message returned to the original sender. This process can be repeated over and over again with the message growing in length as each new reply is placed at the beginning of the message. This is simple when both participants in this communication speak the same language but problems arise when they speak different languages.

Suppose an English speaker sends a message to a German speaker then the source text in English will be translated into German before being forwarded to the recipient. Now if the German speaker elects to reply to this message his text in German will be translated into English but the original message that has already undergone one translation (English to German) could also undergo another translation to convert it from German back into English. The resultant translation of the already translated text will not be the same as the original text because of the limited accuracy of current machine translation language engines and a considerable amount of comprehensibility may be lost. The approaches taken by all previous translation systems have not taken steps to avoid multiple translations. A solution to this problem is to always include the original text along with the translated version so that when the German replies, the original English text can be returned and ensure that text that has already been translated is not subsequently translated again. Similarly, when the English speaker replies to the German, the process is repeated. Thus, the message contains a sequence of both English and German components, as shown below:

| | |
|---|---|
| E1 | → GT1, E1 |
| ET2, G2 \| GT1, E1 | ← G2 \| GT1, E1 |
| E3 \| ET2, G2 \| GT1, E1 | → GT3, E3 \| ET2, G2 \| GT1, E1 |

Where:
  E1 original English text
  GT1 translated German version of the original English text (E1)
  G2 reply to the original English text
  ET2 translated English version of the German reply (G2)
  G3 English reply to the message
  GT3 translated German version of the English reply (E3)

At each stage of the communication between English and German speakers, the translated version of the original message always appears first since it is this part of the message that will be of immediate interest to the recipient. However, it is likely that the English speaker would prefer to see only the English components of this message and similarly the German speaker would prefer to see only the German components of this message. Consequently, the add-in module may need to filter out those components of this message appropriate to one language or the other. However, always filtering such a message could well prove restrictive especially for a bilingual person and thus there ought to be an ability to switch off the filtering process. A button 109 on the toolbar will be used to provide a quick on/off control over the filtering process.

At each stage of the reply process, only the first part of the message need be translated by the central site since the remainder consists of pairings of translated plus original text. Each component part of the MIME message can be marked as either original text or translated text.

Using the CONTENT-LANGUAGE field (see RFC 1766) and ISO 639 language codes for each part of the message can be accordingly marked, thus:
  content-language: en
  content-language: en, de The first example indicates that the accompanying MIME body is 'original text in English' whilst the second indicates 'translated text from English to German'. Thus, whenever CONTENT-LANGUAGE contains a single language identifier it signifies original text and when it contains two identifiers then it is translated text. Thus, once a piece of text has been translated it is clearly identified as such and the central site will not process another translation with the possible subsequent degradation in intelligibility.

Using the previous example of communication between English and German speakers then the MIME bodies would contain the following information:

| | |
|---|---|
| E1 | content-language: en |
| GT1, E1 | content-language: en, de |
| | content-language: en |
| G2 \| GT1, E1 | content-language: de |
| | content-language: en, de |
| | content-language: en |
| ET2, G2 \| GT1, E1 | content-language: de, en |
| | content-language: de |
| | content-language: en, de |
| | content-language: en |

This information can easily be generated by both the add-in module and central site as part of constructing a MIME message and will be used by the filter mechanism to identify the appropriate parts for display. It will also be used by the central site to ensure that already translated text is not re-translated.

Processing a MIME message consisting of logically grouped blocks of text (ET2,G2|GT1,E1) would be considerably simplified if each 'message component' (i.e. ET2,G2 and GT1,E1) could be sectioned somehow in a message to aid their processing. Fortunately, the MIME specification provides a mechanism for encapsulating several representations of the same text in different data formats in a single logical unit (see RFC1521, 7.2.3, multipart/alternative).

```
Message (content-type: multipart/mixed)
  BodyPart 1 (content-type: multipart/alternative)
    BodyPart 1.1 (content-type: text/plain)
    BodyPart 1.2 (content-type: text/html)
  BodyPart 2 (content-type: multipart/alternative)
    BodyPart 2.1 (content-type: text/plain)
    BodyPart 2.2 (content-type: text/html)
```

Although the MIME specification documents encapsulation of the same message in differing data formats, nevertheless there appears no reason why this features cannot be extended to distinguish translated versions from un-translated versions of a piece of text. Using 'content-language' as defined in RFC1766 a MIME message can be constructed to hold multilingual versions of the same messages as follows:

```
Message (content-type: multipart/mixed)
  BodyPart 1 (content-type: multipart/alternative)
    BodyPart 1.1 (content-type: text/rtf) (content-language: de, en)
    BodyPart 1.2 (content-type: text/rtf) (content-language: de)
  BodyPart 2 (multipart/alternative)
    BodyPart 2.1 (content-type: text/rtf) (content-language: en, de)
    BodyPart 2.2 (content-type: text/rtf) (content-language: en)
```

This marginal extension to the MIME protocol should not affect existing email clients, as they will display all components of the message, but will considerably assist the add-in module to filter out the appropriate language component for both sender and recipient of the message.

When a messages is forwarded to a third person, the above mechanism for replies can be used but now the translation system 31 no longer translates the first part of the message but uses the original text to create an additional component. Assuming English, German and French speakers are involved in the communication process with the English speaker sending an initial message to the German who forwards this to the French speaker, thus:

E1→GT1,E1→FT1,GT1,E1

Where:
E1 original English text
GT1 translated German version of the original English text (E1)
FT1 translated French version of the original English text (E1)

Communication between the English and German speakers proceeds as described above but the forwarding of the message by the German to the French speaker needs to be handled differently since the original English text (E1) now needs to be accessed for translation rather than the first component (GT1) of the message. Otherwise, there may be degradation in the quality of the translation since the translated German text could be further translated into French. The resultant FT1,GT1,E1 message is received by the French speaker and filtering to display the appropriate language component of the message proceeds as before. At each stage the message is forwarded another language component, derived from the original English text (E1) will be added to the message. For example if the French speaker now forwards the message onto a Spanish speaker then the message received by them would contain Spanish (ST1), French (FT1) and German (GT1) translations of the original English text (E1), as follows:

E1→GT1,E1→FT1,GT1,E1→ST1,FT1,GT1,E1

Thus, the process of forwarding results in multiple language versions of the original text being attached to the message, whereas replying result in language pairs (translated plus original text) being attached to the message.

To complicate matters a little further, assume that the French speaker instead of forwarding the message to the Spanish speaker in the previous example instead replies to the German who in turn replies to the English speaker, as follows:

E1→GT1,E1→FT1,GT1,E1ET3,G3|GT2,F2|FT1,
  GT1,E1←G3|GT2,F2|FT1,GT1, E1←F2|FT1,
  GT1,E1

Where:
E1 original English text
GT1 translated German version of the original English text (E1)
FT1 translated French version of the original English text (E1)
F2 French reply to the German speaker
GT2 translated German version of reply from the French speaker (F2)
G3 German reply to the English speaker
ET3 translated English version of reply from the German speaker (G3)

Any combinations of replying and forwarding are handled similarly to the examples given above.

The behaviour required to handle forwarding of messages compared with that for replying is subtly different. Since the add-in module can attach itself to both REPLY and FORWARD button events of Outlook it seems sensible to include an application specific parameter within the email header (i.e. x-message-type:=reply) that will indicate which processing needs to be applied to a message rather than place the onus upon the translation system 31 to figure out which behaviour is required. Once a message has been processed by translation system 31 then this application specific parameter can be removed before the message is delivered to the recipient. Although this 'message type' parameter could for the purposes of reply/forward message processing be a Boolean variable, nevertheless it may be preferable to treat this parameter like an enumeration such that it could be used in other message processing contexts.

The combination of replying and forwarding of messages dramatically increases the necessity to support multiple language cores upon the translation system 31. It is not difficult to imagine communication between English, German, French and Spanish speakers in the above examples where the following language pairings may be required:

English-French
English-German
English-Spanish
French-English
French-German
French-Spanish
German-English
German-French
German-Spanish
Spanish-English
Spanish-French
Spanish-German As the number of languages increases the number of language pairings increases dramatically. If a particular language pairing is not supported on the translation system 31 then if the user is sending a message to another person where the particular language pairing is not available, the add-in module needs to warn the user of this situation through a pop-up dialog box whereupon they can take any remedial action.

Receiving a message needs to be handled differently. The user's language is split into first and second preferences along with a default language. Initially, the user's first preference language is used to determine the language pair for translation and if this particular pair is currently not available then their second preference is used, otherwise the default (normally English as all currently available quality language translation systems support translation from a source language into English) is used. In this manner the system attempts to find a language pair for the translation. It is appreciated that having to split a user's language into first and second preferences along with default language is a facet of the restricted number of quality language pairs currently available. The need for this feature will lessen over time as more and more language pairs are added to the central site.

Details of how attachments to messages are handled will now be described. Attachments can take many forms from plain text, formatted text, spreadsheets, presentations, and databases to audio/visual files. For text based, spreadsheet, presentation and database attachments i.e. any attachment with a substantial amount of text, translation may be appropriate. However for audio/visual material it is currently not practicable. Moreover, a user may not want an attachment translating because they consider machine translation of the document may be inappropriate for whatever reason. Therefore, the translation of attachments should be totally distinct from the automatic translation of the email body. However, when translation is appropriate then at the time of attaching a file or sometime later whence accessing the attachment properties, translation of the attachment can be switched on or off by the user.

Depending upon the type of document being attached to a message, knowledge about the language it has been written in may or may not be available from the attachment itself. For instance plain ASCII text has no information about the language in which it has been written whereas a formatted document such as an RTF or HTML document may include information about the language in which it has been written. Thus, at the time of attaching a file a document's language may need to be specified. If the attachment contains formatted text then language information could well be available and thus the user need not be requested for this information. In contrast, if an attachment is plain text then the user needs to indicate the language used to write the document.

When a recipient replies to a message, all attachments are dropped and only an indication of their presence is provided when the reply is received. However, when a message is forwarded then attachments remain part of the message. For replies it does not matter whether attachments were translated or not since they are never returned to the original sender. However, forwarding is a completely different matter in that it raises all the same issues for attachments as it does for the email body, as described above. The example cited earlier where an English speaker sends a message to a German who then forwards it onto a French speaker can be considered. At the time the English speaker elects to translate an attachment they have no knowledge that the German will forward this message onto the Frenchman. The message thus needs to contain the original English version of the attachment along with the German translation so when the German forwards the message onto the French speaker it's the original English attachment that is translated into French, as follows:

EA1→GAT1,EA1→FAT1,GAT1,EA1

Where:
- EA1 original English attachment
- GAT1 translated German version of the original English attachment (EA1)
- FAT1 translated French version of the original English attachment (EA1)

When a message contains more than one attachment then only for that particular attachment the user has elected to translate will there be both the original and translated versions included in the message.

A further complication arises when an attachment is modified and subsequently the message is either returned to the sender or forwarded on to another party. Modification can consist of either editing the attachment in situ or saving the modified document to disk and then re-attaching to the message. In either case, the attachment has to be treated as though it were a completely new item being attached to the message. In the above example, where the German speaker modifies the attachment before forwarding the message onto the French speaker, it is irrelevant whether the original English version of the attachment was included or not in the message since now it is the German version of the attachment that needs translating into French. It is evident that a double translation will occur from English-German and German-French with resultant degradation in intelligibility. The user needs to be alerted to this potential double translation hazard and given the opportunity to proceed with sending the message or cancel the operation and take some remedial action.

One other operation that needs to be considered for an attachment is deletion. In the case were this is an original language document then no further action need be taken. However, when a message contains both original and translated versions of a document then deleting one or the other raises some issues for translation, as follows:

1) Original deleted and message forwarded:
   Under this circumstance the original has been lost for translation leaving only the translated version available whereupon a double translation would result.
2) Translated deleted and message forwarded:
   In this circumstance the original is available for translation and the message can be sent without any problems.

Both original and translated version of an attachment could be viewed as a single entity so deleting one would remove the other. In practice, treating both attachments as a single logical entity may prove restrictive for some users. A better approach would be to raise an appropriate warning informing the user of the consequences of their action whereupon they can elect to proceed with deletion or cancel the operation.

Consideration will now be given to the issue of handling items within emails. Outlook support the addition of various items of information into an email either within the email body itself as additional text or within an attachment. Only those items that are fundamental textual in nature are discussed in the following section.

When an email within an email message is sent, Outlook inserts the embedded email as an attachment to the encapsulating message. Consequently all the features for handling attachments as described above will equally apply to the embedded email.

In Outlook, notes can be added to an email either as text or an attachment. Assuming it is added as text then the note forms part of the email body and as such is indistinguishable from the rest of the email content. Alternatively, if added as an attachment then it becomes a simple text based attachment and processed accordingly.

Details of how translation quality can be improved will now be described. Whilst users are generally aware that machine translation is not 100% perfect, nevertheless without appropriate mechanisms to improve translation quality then translations can best be characterised as a 'gist' of the original text. Although, the quality of translation is less than can be achieved by incorporating translation options into the system, if these mechanisms to improve translation quality are not used, it nonetheless is sufficiently good to convey the original meaning. However, the quality of translation may discourage some users from carry on using the translation service. Thus, the ability to set up a mechanism to improve translation quality needs to be a fundamental part of the system.

The following is a list of some of the options supported by a typical translation server such as the Systran™ translation server.
- Document Type
- Topical Glossaries
- Do not translate (DNT) lists
- Customer specific Dictionaries (CSD)

The Systran translation server is suitable for use in the present invention, as will be other translation products likely to be developed.

The document type defines the content style of the text and can significantly affect translation quality. The following is a list of document types supported by the Systran translation server:
- Abstract
- Conversational/Colloquial
- Correspondence
- Journalism Meeting Minutes
None
Parts List
Patents
Prose
User Manual Considering that selection consists of any one item from the list then a pull-down selection box is the most appropriate feature with which to present this information.

Topical glossaries are another tool for improving translation accuracy. Selecting an appropriate topical glossary can greatly improve translation quality. The following is a list of glossaries supported by the Systran translation server:

Automotive
Aviation/Space
Chemistry
Colloquial
Computers/Data Processing
Earth Sciences
Economics/Business
Electronics
Food Sciences
General
Legal
Life Sciences
Mathematics
Mechanical Engineering
Medicine
Metallurgy
Military Science
Naval/Maritime
Photography/Optics
Physics/Atomic Energy
Political Science Up to four glossaries may be selected for a single message and arranged in priority by the user. When the message arrives at the central site, the highest priority glossary is first chosen to obtain the meaning of a word or phrase and if the word of phrase is found then that meaning will be used in the translation process. However, if the word or phrase is not found in the highest priority glossary then the next highest priority glossary in sequence is chosen and so on. In the event that a word is not found in any of the glossaries then the meaning from the general dictionary for that language pair will be used.

A 'do not translate' list can also be used to improve translation quality. The 'do not translate' list of words covers such items as names of people and places that the translation engine should leave unaltered. A simple edit box would suffice for entry and updates to this information.

Unlike the previous options of document type and topical glossaries, where the information relating to these features are held at the central site rather than within the add-in module, the 'do not translate' list is free-form information and user specific. Thus, a list of words as specified by the user is attached to each message sent to the translation system 31. Furthermore, for users with their own messaging capability, a corporate-wide 'do not translate' list can reside on the messaging server that can be combined with the user-specific list. In this case, both lists will be attached to the message and passed to the central site.

It is likely that most of the email body constituting a message will need to be translated. However, for example, where a specific phrase has been borrowed from another language and used within the email text, or a specific word is used within the message that a user does not want translating but which is not in the do not translate list, then there needs to be a mechanism for bringing this text to the attention of the translation engine so that it remains unchanged. The easiest method is for the user to mark a piece of text by highlighting that text in the same manner for cut, copy and paste operations. Using one of the translation system menu options the selected text can be marked for 'do not translate'. Alternatively, using right-mouse click can bring up a pop-up dialog whereupon selecting 'properties' the same operation can be accomplished. Clearly, this requires modification of a 'common dialog' to interject this translation system specific feature.

Inserting markers into the email text is only practicable when the Outlook text editor is configured for formatted text such as RTF or HTML. When configured for plain text, markers can be still inserted into the text stream however they will be visible to the user and may reduce the readability of the message. Consequently, the ability to highlight text for 'do not translate' should only be supported when RTF, HTML or other formatted text is used.

The markers used to highlight a section of text are unlikely to be those used by the translation engine. Consequently, the add-in uses the most appropriate feature to mark text in a RTF or HTML message and the central site needs to recognise these markers and perform any necessary conversion before submitting the message to the translation engine.

Customer specific dictionaries can also be provided which allow a user to define terms that are not in the standard dictionaries and have a specific or unusual meaning in their organisation or industry.

Obviously, a customer specific dictionary is related to a specific source-target language pairing consequently its selection has to be based upon the current language pairing defined upon the toolbar options. Entries in a customer specific dictionary include a word or expression in the source language, a target language meaning and some grammatical information. In common with 'do not translate' lists, customer specific dictionaries are associated with a particular user and thus the customer specific dictionary needs to be attached to each message sent to the translation system 31. Furthermore, for users with their own messaging server a centralised customer specific dictionary can be supported that is used in conjunction with the user's customer specific dictionary. Consequently, both dictionaries need to be attached to messages but a single customer specific dictionary is passed to the translation system.

If the above features or similar are not supported by the system, then the quality of translation drops down to that level which might be described as a gist of the original text.

Even after using all of the options discussed above there is no guarantee that the translation server may not stumble over some unknown word or phrase whereupon the original text will appear in the translated output. To provide a degree of feedback the translation system could mark anything it does not understand as a 'not found word'. However, in the normal course of events the sender has no access to the translated message so is unable to make the appropriate adjustments to the translation options, for example the DNT and CSD lists, to account for 'not found words'.

What is required is an echo-back facility activated by the echo back button 104 whereby a user can submit a message to the translation system 31 and have the translated message returned to them with all of the 'not found words' and words with multiple translations marked in some manner.

Although checking for 'not found words' involves sending the message in question to the translation system 31 for processing nevertheless that message is subsequently not delivered to the recipient and therefore is an action not supported by the 'send message' facility. Thus, 'not found words' checking requires a separate button on the toolbar 18 for this purpose, hence the addition of the echo-back button 104.

When using the Echo-back function, a user creates a message in the normal manner and hits the Echo-Back button 104 upon the toolbar 18 to send a message to the central site 31 for a trial translation. The message is returned to the sender along with information regarding problems encountered during the translation process. Fundamentally there are two reasons why the translation process may have encountered problems; either a word has not been found in the translation engine's dictionaries or a word has multiple translations into the target language depending upon context and the translation engine cannot determine which meaning ought to be used.

If the translation engine, using its own dictionaries, reports a 'not found' condition then the translation service 34 on the central site 31 will search one or more further online dictionaries for suitable translations. These online dictionaries may be on the central site 31, or located elsewhere and accessed from the central site. Any possible translation options for a not found word are attached to the message for return to the sender. If a translation for a word has been found in an online dictionary then it is a candidate for being added to the CSD whereas if not found then the word is a candidate for inclusion in the DNT list. Even if a word cannot be found in an online dictionary this does not necessarily indicate that a suitable translation may not be available since such dictionaries may not encompass every word or phrase within a language. The user having been presented with information derived from the online dictionary can elect to use this information or consult any linguistic resources that they feel appropriate, of which the online dictionary may be just one.

Information obtained from the online dictionary by the message processing component of the central site, such as possible translations for 'not found words', is attached to the translated message as an XML structured data block and the resultant message returned to the sender whereupon the message will appear in the user's inbox in the normal manner. The message will contain information within its header to identify it as an echo-back message containing additional information. Thus when the user selects this message the add-in module will use the attached XML data block to highlight those words that caused difficulties for translation process. Selecting one of the highlighted words, for example by using right mouse click upon a highlighted piece of text, results in the information returned for the word in question being displayed to the user. The user can then choose one of the entries for inclusion within their CSD or alternatively go to the central site to search the online dictionaries as well as consult other source for a suitable translation and add this information to their CSD. If no information was returned by the central site then the word is possibly a noun whereupon the user can add it to their DNT list.

After a user has processed some or all of the highlighted text, they can elect to perform another Echo-Back operation to check that the new information they have added to their CSD and DNT results in a faultless translation. Up to this juncture the user has been operating upon the returned message through a window that provides a 'view only' perspective upon that message. To send that message for a further trial translation or amend, or add additional material to, the message or alter the list of recipients the user needs to select the 'Re-send button 107 upon the toolbar 18 whereupon the message is copied into another window that enables the user to modify the message before it is dispatched. One option is to amend the message so as to replace a word or words with a different word or words where the problems with translation highlighted by the Echo-back function cannot be resolved. Once the message has been amended it can be sent using the send button 101, or sent back for another trial translation using the Echo-back button 104 again.

A user can invoke the Echo-Back facility as many times as they wish until they are satisfied with the resultant translation whereupon they can send that message on to the intended recipients in the normal manner using the send button 101. When the message has been through the echo-back process it includes marked up information relating to the 'not found words' and words with multiple translations. This information remains attached to the message until the user has taken affirmative action to add the information marked in the message to their DNT or CSDs whereupon any remaining marked up information will accompany the messages when it is finally sent to the recipient via the translation site. At this point the translation site may use this information in the translation process, but will remove all marked up text from the message before it is forwarded to the recipient.

Because the Echo-back facility can be invoked at any stage of constructing a message there may be no recipient, one recipient or multiple recipients defined at the time when it is used. In the situation of no defined recipients or multiple recipients the system prompts the user to specify a target language before the message is sent for the trial translation. For a single recipient whose language does not match that of the sender then their language is assumed to apply. When multiple recipients are defined then Echo-Back will have to be invoked for each possible target language. This is not rigidly enforced and the user can elect to send a message at any time with the understanding that translation problems may arise for those target languages they have not previously invoked Echo-back.

The Echo-Back facility provides a simple mechanism for a user to check the resultant translation. Without this immediate feedback it would be more problematic for the user to improve translation quality by making adjustments to translation options and/or make enhancements to their CSDs and DNTs.

All other message options would not be affected by the 'not found words' checker. For example, if a user has not elected to translate an attachment then it would not be processed by the translation engine and hence any unknown words or phrases within the attachment would not become apparent. After one or more iterations with the 'not found words' checker a user is satisfied there are no discernible translation problems, the message can then be sent to the recipient in the normal manner.

A corresponding situation exists at the recipient end of the communication link in that not until a message has been translated will a user be able to make any value judgements regarding those features that can be applied to improve the translation process. Thus, a received email will be presented to a user, usually on the screen of their computer system, whose quality of translation may not necessarily be the best possible but sufficient to provide a gist of the underlying content. Now having received a message in their own language a user is in a position to make judgements as to which feature ought to be applied to a message to improve the translation quality. Therefore, once a message has been initially translated a user is given the opportunity to resubmit a message using the resubmit button 106 for re-translation using those features they think will improve the translation quality as many times as they like until they are satisfied with the result. All features described above, including 'not found words' list, are part of the resubmission process.

The received message contains information in the native language of the sender and the initial translation only translates the email body with any attachments remaining un-translated since not until the user is able to read the translated email can they make any judgement on whether any or all attachments ought to be translated. The user can decide if they wish to pursue re-translation of the email body only or include any attachment in the process. For example, if an attachment is a spreadsheet then translating such a document may serve no purpose for the user so they are given the option of omitting any one or all attachments from the re-translation process. This option can be provided, for example, by producing a select list of parts of the message to be re-translated when the re-submit function is selected. This enables the user to select those parts which are to be re-submitted.

Resubmit is an action that is undertaken upon a received message very much like the replying and forwarding. Moreover, there is no button on conventional systems that provides anything remotely similar to resubmit, and therefore the re-submit button 106 is required on the toolbar for this purpose.

The Resubmit feature allows the recipient of a message to send it to the central site 31 for translation and have the resultant message return to them. This feature is required when an un-translated message has been received and the automatic language detection process has wrongly identified the source language, or when a translated message has been received from a subscriber to the translation service and they have incorrectly defined the recipient's language. In either case, the recipient can redefine either source or target languages for the translation process and resubmit the message.

Apart from correcting source or target language discrepancies as described above, another purpose of the resubmit function is to heighten translation quality. Thus when the re-submit function is selected the user is presented with a window which enables them to re-define the source or target language, as well as to re-define the CSD or the DNT list, or any other translation parameters so as to obtain a better translation.

A major component in heightening translation quality is the CSD that provides a translation from source to target language that is either missing from the translation engine's dictionary or overrides any entry contained therein. The normal usage of a CSD is to provide a translation from the message creator's language (source) into the viewer's language (target). Use of a CSD in the resubmit situation requires a CSD for a foreign language into the recipient's native language. This is a particular problem for individual users since they invariably have CSDs from their own language into some other language. However for corporate users, they will probably have CSDs for translation between languages in either direction and thus using resubmit to height translation quality may be a viable operation. If a message has been sent from a subscriber to the translation service the quality of translation is likely to be good thereby mitigating the need for a re-submit feature. Conversely, where the message has originated from a non-subscriber the initial translation quality may not be ideal and thus a re-submit function is a valuable system feature.

A user will have set up various translation options to control the quality of the translated output. This information needs to be conveyed somehow within the message so that the central site can set up the translation engine appropriately. This information is only of use to the translation engine and consequently will not form part of the reconstructed message sent to the recipient.

Fortunately, the MIME protocol (see RFC1521) beyond defining a variety of standard body types allows system designers to defined application specific body types providing they exist only within their own application domain. In this particular application the add-in module inserts a new body type into the message whereupon it is removed by the central site thereby conforming to the application specific criterion.

Akin to the RFC822 protocol, RFC1521 provides for application specific definitions using the x-token format, where token can be any appropriate term for the new body type, thus:
    content-type: x-token/subtype The element 'subtype' can contain any term appropriate for the application to further qualify the definition. For example, rather than conveying all of the translation options in one single MIME body part it might be more appropriate to sub-divided, thus:
    content-type: x-translation/document-type
    content-type: x-translation/topical-glossaries
    content-type: x-translation/do-not-translate To provide for maximum flexibility all translation options will be conveyed as option name following by the option parameter with each item being on a separate line, as the following example shows:
    glossary1=computers/data processing
    glossary2=electronics Although some of the translation options could be conveyed using an enumerated variable (e.g. Systran™ glossaries) that would save upon processing time nevertheless much of the information is textual in nature. Furthermore, whilst the Systran™ glossaries to be used can be specified using an enumerated variable (e.g. aviation/space=4) this approach may not be suitable for other engines added to the translation server. Another factor to consider is that MIME messages processing is fundamentally a string parsing and comparison exercise so a few extra bits of string manipulation to extract translation options is of little consequence. Thus, adopting a textual based approach to conveying translations options can provide for maximum flexibility and robustness in coping with changes which might occur in the future.

There are numerous other items that need to be considered such as punctuation, date format and language specific abbreviations. However, these types of language or cultural localisation features can be handled by the central site, since they will apply to all users, simplifying the process of improving translation quality.

Details of what happens when the add-in module is installed on the users system will now be described. Upon installation the add-in only needs information relating to the users' first preferred language, their second preferred language and the default language for the invention to work on received messages. It also modifies the contacts list 10a and the contact information entry forms to allow inclusion of a contact's preferred languages. The user is instructed that for automatic operation of the translation service they would be advised to fill in the recipient's language information at their earliest opportunity. Failing to enter the recipient's language in the contacts list may result in the message being sent directly to the recipient without it being translated, as discussed above.

By virtue of the add-in module being installed on the users system it can control the information inserted into the recipients' and senders language fields on the system and using ISO-639 language codes, locale independent information, for example French, however it is translated within the add-in module for localisation purposes e.g. French, francais, francés, will always be presented to the central site consistently as the two character code 'fr'.

Selecting an email address in the To:, CC: or BCC: fields on the send message form using right-mouse click causes a pop-up dialog box to appear. Selecting 'properties' on this pop-up displays a dialog containing various tab sheets showing information about that particular person held in the contacts list. This dialog box can be arranged to display the recipient's language, preferably upon the first tab sheet where the essential information about that person is displayed.

A feature within recent Outlook versions is an ability to set up a 'directory service' which uses the Lightweight Directory Access Protocol (LDAP) (see RFC2251) to gain access to private or public directories. A user can search an internal company directory or a publicly accessible directory on the Internet to obtain details about an individual such as their email address.

In recent Outlook versions a directory service can be set up using the menu item 'Tools/Accounts' thereafter accessing 'Tools/Address Book' will display the address book dialog whereupon selecting the 'Find People' button on the toolbar will display the 'Find People' dialog box. The 'look in' pull-down list box can be used to select a particular directory service and after entering the desired search information the specified directory can be searched. Assuming the search is successful the person's details can then be added to the user's contact list. At this juncture, the 'Properties' dialog box is displayed whereupon the individual's language can be defined. Choosing the OK button will save the new information into the contacts list.

At installation time, a dedicated language field is added to the contacts list, as described above. This language field is added to the 'Properties' dialog (preferably on the initial Name tab) so that the user can update the field for the individual before saving their details into the contacts list.

The Outlook journal can hold information about a number of different events that have occurred within Outlook and one of these events relates to email messages. The journal can be set up to log email messages sent to or received from every person in the contact list or a selected number of individuals. This feature can be used to track those individuals for which the translation service has been invoked.

The above sections provide an illustration of how the invention could be implemented within Microsoft Outlook™, although the examples shown are by no means exhaustive. However, most, if not all of the features discussed are applicable to other email clients running upon a Windows™ based computer system as well as similar email clients running upon operating systems such as Linux since the tasks being performed to handle email communication are common throughout. Where differences occur across email clients these are likely to be accommodated within the add-in module at run-time. Otherwise, compile-time changes are likely to port the technology from one operating system to some other.

Fundamentally, the technology described within this invention is neither communication protocol specific, nor email client specific, nor operating system specific and thus can be adapted for use in many different communication environments.

The invention claimed is:

1. A communication system for human communication comprising:
   a sending system that sends a communication in an original language from a sender;
   a receiving system that receives the communication for a recipient, and
   a translation system that translates a first part of the communication from the original language into a translated language to produce a translated part, and that combines the translated part and said first part of the communication, which is still in the original language, to form a modified communication for sending to the receiving system,
   wherein the receiving system enables forwarding the modified communication to at least one further recipient having a further recipient language associated with it, compares the further recipient language with both the original language and the translated language of the communication and, if a further translation is required, sends the modified communication to the translating system for further translating, with an indicator identifying the original language version of the part.

2. A system according to claim 1 wherein the translating system includes communication identifying means to enable the part in the original language to be identified.

3. A system according to claim 1 wherein the sending system defines within the communication a plurality of parts such that each part can be treated in a suitable way by the translation system.

4. A system according to claim 3 wherein the sending system identifies any of said parts which are not to be translated into the recipient's language.

5. A system according to claim 3 wherein the sending system defines each of the parts such that it can have its own translation parameters associated with it.

6. A system according to claim 3 wherein one of said parts comprises an attachment.

7. A system according to claim 3 wherein one of said parts comprises a message embedded in the communication.

8. A system according to claim 1 wherein the translating system carries out said further translation from the part in the original language.

9. A system according to claim 8 wherein the translating system adds the further translation of the part to the modified communication to form a further modified communication including three versions of the part in different languages.

10. A system according to claim 1 wherein the translation system includes identifying means to enable the original language of each part of the communication, and any subsequent translations of that part to be identified.

11. A system according to claim 10 wherein the receiving system includes display means for displaying the communication to the recipient, and control means for selecting parts of the communication for display on the basis of the language of the parts.

12. A system according to claim 11 comprising input means to enable the recipient to select which language or languages at least some of the translated parts are displayed in.

13. A method of sending a communication comprising:
   sending the communication from a sending system to a translation system in an original language,
   translating a first part of the communication from the original language to a translated language to produce a translated part,
   combining the translated part and said first part of the communication, which is still in the original language, to form a modified communication,
   sending the modified communication to at least one further recipient having a further recipient language associated with it,
   comparing the further recipient language with both the original language and the translated language and,
   if a further translation is required, sending the modified communication to the translating system for further translating, with an indicator identifying the original language version of the part.

\* \* \* \* \*